US012208306B2

(12) United States Patent
(10) Patent No.: US 12,208,306 B2
(45) Date of Patent: Jan. 28, 2025

Bayerlein et al.

(54) TREADMILL WITH INTERMEDIATE MEMBER

(71) Applicant: Woodway USA, Inc., Waukesha, WI (US)

(72) Inventors: Douglas G. Bayerlein, Oconomowoc, WI (US); Nicholas A. Oblamski, Waukesha, WI (US); Jose D. Bernal-Ramirez, West Allis, WI (US); Daniel D. Wagner, Waukesha, WI (US); Robert L. Zimpel, Menomonee Falls, WI (US)

(73) Assignee: Woodway USA, Inc., Waukesha, WI (US)

( * ) Notice: Subject to any disclaimer, the term of this patent is extended or adjusted under 35 U.S.C. 154(b) by 0 days.

(21) Appl. No.: 18/499,171

(22) Filed: Oct. 31, 2023

(65) Prior Publication Data

US 2024/0075339 A1 Mar. 7, 2024

Related U.S. Application Data

(60) Continuation of application No. 17/849,313, filed on Jun. 24, 2022, now Pat. No. 11,826,608, which is a (Continued)

(51) Int. Cl.
*A63B 22/02* (2006.01)
*A63B 21/00* (2006.01)
(Continued)

(52) U.S. Cl.
CPC .... *A63B 22/0285* (2013.01); *A63B 21/00069* (2013.01); *A63B 21/0125* (2013.01);
(Continued)

(58) Field of Classification Search
CPC ........ A63B 21/00058; A63B 21/00069; A63B 21/00076; A63B 21/00185; A63B 21/012;
(Continued)

(56) References Cited

U.S. PATENT DOCUMENTS

| | | | |
|---|---|---|---|
| 8,308 | A | 8/1851 | Seymour |
| 26,914 | A | 1/1860 | Meldrum et al. |

(Continued)

FOREIGN PATENT DOCUMENTS

| | | |
|---|---|---|
| CN | 3201120 | 9/2001 |
| CN | 2860541 | 1/2007 |

(Continued)

OTHER PUBLICATIONS

U.S. Appl. No. 05/616,951, filed Sep. 26, 1975, Schonenberger.

(Continued)

*Primary Examiner* — Gary D Urbiel Goldner
(74) *Attorney, Agent, or Firm* — Foley & Lardner LLP

(57) ABSTRACT

A manually powered treadmill includes a front rotatable element and a rear rotatable element coupled to a frame; a bearing assembly at least partially supporting one of the front or rear rotatable elements; and a running belt disposed about the front and rear rotatable elements. The bearing assembly includes a predefined low viscosity bearing fluid. The running belt defines a non-planar running surface. The running belt includes a first endless belt and a plurality of slats, each slat having a first side and a second side and coupled to the first endless belt. Each slat in the plurality of slats defines at least one aperture, and the at least one aperture is structured to receive a fastener to facilitate coupling to the first endless belt.

16 Claims, 15 Drawing Sheets

Related U.S. Application Data continuation of application No. 16/732,981, filed on Jan. 2, 2020, now Pat. No. 11,369,835, which is a division of application No. 15/765,681, filed as application No. PCT/US2016/055572 on Oct. 5, 2016, now Pat. No. 10,709,926.

(60) Provisional application No. 62/237,990, filed on Oct. 6, 2015.

(51) Int. Cl.

| | |
|---|---|
| ***A63B 21/012*** | (2006.01) |
| ***A63B 22/00*** | (2006.01) |
| ***A63B 22/20*** | (2006.01) |
| ***A63B 24/00*** | (2006.01) |
| ***A63B 69/00*** | (2006.01) |
| ***A63B 71/00*** | (2006.01) |
| ***A63B 71/06*** | (2006.01) |
| *H05F 3/02* | (2006.01) |

(52) U.S. Cl.

CPC ...... *A63B 22/0023* (2013.01); *A63B 69/0057* (2013.01); *A63B 22/0235* (2013.01); *A63B 2022/206* (2013.01); *A63B 24/0087* (2013.01); *A63B 2071/0072* (2013.01); *A63B 71/0622* (2013.01); *A63B 2071/0694* (2013.01); *A63B 2210/50* (2013.01); *A63B 2220/36* (2013.01); *A63B 2220/40* (2013.01); *A63B 2220/58* (2013.01); *A63B 2225/093* (2013.01); *A63B 2225/682* (2013.01); *A63B 2230/06* (2013.01); *H05F 3/02* (2013.01)

(58) Field of Classification Search

CPC . A63B 21/0125; A63B 21/015; A63B 21/068; A63B 21/15; A63B 21/151; A63B 21/154; A63B 21/155; A63B 21/156; A63B 21/22; A63B 21/225; A63B 21/4023; A63B 21/4027; A63B 21/4033; A63B 21/4034; A63B 21/4041; A63B 21/4045; A63B 21/4049; A63B 22/0023; A63B 22/0046; A63B 22/02; A63B 22/0285; A63B 22/18; A63B 22/20; A63B 22/201; A63B 22/203; A63B 22/208; A63B 2022/206; A63B 23/035; A63B 23/03516; A63B 23/04; A63B 23/0405; A63B 23/047; A63B 23/0482; A63B 23/0494; A63B 69/0022; A63B 69/0028; A63B 69/0035; A63B 69/0057; A63B 69/18; A63B 69/182; A63B 2069/0031; A63B 2069/0037; A63B 71/0054; A63B 2071/0063; A63B 2071/0072; A63B 2071/0081; A63B 2071/009; A63B 2208/0204; A63B 2244/18; A63B 2244/186; A63B 2244/19; H05F 3/02

See application file for complete search history.

(56) References Cited

U.S. PATENT DOCUMENTS

| | | | |
|---|---|---|---|
| 83,844 | A | 11/1868 | Goucher |
| 104,534 | A | 6/1870 | Ashe |
| 111,018 | A | 1/1871 | Thompson |
| 118,030 | A | 8/1871 | Lovegrove et al. |
| 144,224 | A | 11/1873 | Potter |
| 144,225 | A | 11/1873 | Purple |
| 171,353 | A | 12/1875 | Conway |
| 179,789 | A | 7/1876 | Hedges |
| 219,439 | A | 9/1879 | Blend |
| 254,293 | A | 2/1882 | Edleblute et al. |
| 314,674 | A | 3/1885 | Hubbard |
| 374,811 | A | 12/1887 | Savage |
| 411,986 | A | 10/1889 | Frazeur et al. |
| 641,424 | A | 1/1900 | Taitel et al. |
| 759,296 | A | 5/1904 | Morairty |
| 767,221 | A | 8/1904 | Hagen |
| 783,769 | A | 2/1905 | Wright |
| 931,394 | A | 8/1909 | Day |
| 1,016,729 | A | 2/1912 | Barrett |
| 1,211,765 | A | 1/1917 | Schmidt |
| 2,117,957 | A | 5/1938 | Heller |
| 2,399,915 | A | 5/1946 | Drake |
| 2,512,911 | A | 6/1950 | Benice |
| 2,842,365 | A | 7/1958 | Kelley |
| 3,637,206 | A | 1/1972 | Chickering, III |
| 3,642,279 | A | 2/1972 | Cutter |
| 3,728,261 | A | 4/1973 | Mitacek |
| 3,870,297 | A | 3/1975 | Elder |
| 3,968,543 | A | 7/1976 | Shino et al. |
| 4,334,676 | A | 6/1982 | Schonenberger |
| 4,389,047 | A | 6/1983 | Hall |
| 4,406,451 | A | 9/1983 | Gaetano |
| 4,544,152 | A | 10/1985 | Taitel |
| 4,548,405 | A | 10/1985 | Lee et al. |
| 4,576,352 | A | 3/1986 | Ogden |
| 4,614,337 | A | 9/1986 | Schonenberger |
| 4,635,711 | A | 1/1987 | Shoji et al. |
| 4,635,771 | A | 1/1987 | Shoji et al. |
| 4,635,928 | A | 1/1987 | Ogden et al. |
| 4,659,074 | A | 4/1987 | Taitel et al. |
| 4,726,581 | A | 2/1988 | Chang |
| 4,886,266 | A | 12/1989 | Trulaske |
| 4,938,469 | A | 7/1990 | Crandell |
| 5,018,343 | A | 5/1991 | Finke |
| 5,031,901 | A | 7/1991 | Saarinen |
| 5,044,470 | A | 9/1991 | Nicholas |
| 5,094,447 | A | 3/1992 | Wang |
| 5,145,480 | A | 9/1992 | Wang |
| 5,162,988 | A | 11/1992 | Semerau et al. |
| D333,887 | S | 3/1993 | Dowler |
| 5,242,339 | A | 9/1993 | Thornton |
| 5,368,532 | A | 1/1994 | Farnet |
| 5,290,205 | A | 3/1994 | Densmore et al. |
| 5,310,392 | A | 5/1994 | Lo |
| 5,318,487 | A | 6/1994 | Golen et al. |
| 5,378,213 | A | 1/1995 | Quint |
| 5,411,279 | A | 5/1995 | Magid |
| 5,411,455 | A | 5/1995 | Haber et al. |
| 5,431,612 | A | 7/1995 | Holden |
| 5,470,293 | A | 11/1995 | Schonenberger |
| 5,492,517 | A | 2/1996 | Bostic et al. |
| 5,538,489 | A | 7/1996 | Magid |
| 5,575,740 | A | 11/1996 | Piaget et al. |
| 5,577,598 | A | 11/1996 | Schoenenberger |
| 5,607,376 | A | 3/1997 | Magid |
| 5,643,144 | A | 7/1997 | Trulaske |
| 5,669,856 | A | 9/1997 | Liu |
| 5,683,332 | A | 11/1997 | Watterson et al. |
| 5,688,209 | A | 11/1997 | Trulaske et al. |
| 5,709,632 | A | 1/1998 | Socwell |
| D392,351 | S | 3/1998 | Coody et al. |
| D403,034 | S | 12/1998 | Moon et al. |
| 5,856,736 | A | 1/1999 | Rotunda et al. |
| 5,887,579 | A | 3/1999 | Eriksson et al. |
| 5,891,830 | A | 4/1999 | Koltermann et al. |
| 5,897,461 | A | 4/1999 | Socwell |
| 6,042,514 | A | 3/2000 | Abelbeck |
| 6,053,848 | A | 4/2000 | Eschenbach |
| 6,056,072 | A | 5/2000 | Koltermann et al. |
| 6,095,952 | A | 8/2000 | Ali et al. |
| 6,146,315 | A | 11/2000 | Schonenberger |
| 6,152,854 | A | 11/2000 | Carmein |
| 6,180,210 | B1 | 1/2001 | Debus |
| 6,328,676 | B1 | 12/2001 | Alessandri |
| 6,334,836 | B1 | 1/2002 | Segasby |
| 6,334,839 | B1 | 1/2002 | Lim et al. |
| 6,348,025 | B1 | 2/2002 | Schonenberger |
| 6,387,015 | B1 | 5/2002 | Watson |

(56) References Cited

U.S. PATENT DOCUMENTS

| | | | |
|---|---|---|---|
| 6,454,679 | B1 | 9/2002 | Radow |
| 6,468,189 | B2 | 10/2002 | Alessandri |
| 6,500,097 | B1 | 12/2002 | Hall |
| 6,616,578 | B2 | 9/2003 | Alessandri |
| 6,652,424 | B2 | 11/2003 | Dalebout |
| D484,554 | S | 12/2003 | Hellman et al. |
| 6,740,009 | B1 | 5/2004 | Hall |
| 6,761,667 | B1 | 7/2004 | Cutler et al. |
| 6,761,669 | B1 | 7/2004 | Pan et al. |
| 6,824,502 | B1 | 11/2004 | Huang |
| 6,837,830 | B2 | 1/2005 | Eldridge |
| 6,893,382 | B1 | 5/2005 | Moon et al. |
| 6,923,746 | B1 | 8/2005 | Skowronski et al. |
| 6,958,032 | B1 | 10/2005 | Smith et al. |
| 7,090,620 | B1 | 8/2006 | Barlow |
| 7,115,073 | B2 | 10/2006 | Nizamuddin |
| 7,179,205 | B2 | 2/2007 | Schmidt |
| D562,416 | S | 2/2008 | Fedriga et al. |
| D566,209 | S | 4/2008 | Alessandri et al. |
| 7,410,449 | B2 | 8/2008 | Yeh |
| D579,992 | S | 11/2008 | Cesaroni |
| 7,560,822 | B1 | 7/2009 | Hoffmann |
| 7,608,023 | B2 | 10/2009 | Casagrande |
| 7,618,345 | B2 | 11/2009 | Corbalis et al. |
| 7,704,191 | B2 | 4/2010 | Smith et al. |
| 7,717,828 | B2 | 5/2010 | Simonson et al. |
| 7,780,573 | B1 | 8/2010 | Carmein |
| 7,789,800 | B1 | 9/2010 | Watterson et al. |
| 7,806,805 | B2 | 10/2010 | Barufka et al. |
| 7,828,699 | B2 | 11/2010 | P'Erez De Lazarraga |
| 7,837,596 | B2 | 11/2010 | Astilean |
| 7,862,483 | B2 | 1/2011 | Hendrickson et al. |
| 7,914,421 | B2 | 3/2011 | Weier et al. |
| 8,007,408 | B1 | 8/2011 | Moran et al. |
| 8,007,422 | B2 | 8/2011 | Zaccherini |
| 8,075,450 | B2 | 12/2011 | Fabbri et al. |
| 8,079,939 | B1 | 12/2011 | Wang |
| 8,206,269 | B2 | 6/2012 | Fabbri et al. |
| 8,241,187 | B2 | 8/2012 | Moon et al. |
| 8,308,619 | B1 | 11/2012 | Astilean |
| D672,827 | S | 12/2012 | Alessandri et al. |
| 8,343,016 | B1 | 1/2013 | Astilean |
| D682,372 | S | 5/2013 | Alessandri et al. |
| 8,496,566 | B2 | 7/2013 | Casadei |
| 8,512,209 | B2 | 8/2013 | Guidi et al. |
| 8,585,561 | B2 | 11/2013 | Watt et al. |
| 8,676,170 | B2 | 3/2014 | Porrati et al. |
| 8,690,738 | B1 | 4/2014 | Astilian |
| 8,734,300 | B2 | 5/2014 | Piaget et al. |
| D707,763 | S | 6/2014 | Cutler |
| 8,864,627 | B2 | 10/2014 | Bayerlein et al. |
| 8,876,668 | B2 | 11/2014 | Hendrickson et al. |
| 8,920,347 | B2 | 12/2014 | Bayerlein et al. |
| 8,968,160 | B2 | 3/2015 | Cassano |
| 8,986,169 | B2 | 3/2015 | Bayerlein et al. |
| 9,005,085 | B2 | 4/2015 | Astilean |
| 9,039,580 | B1 | 5/2015 | Bayerlein et al. |
| 9,044,635 | B2 | 6/2015 | Lull |
| D736,866 | S | 8/2015 | Oblamski et al. |
| 9,192,810 | B2 | 11/2015 | Beard et al. |
| 9,216,316 | B2 | 12/2015 | Bayerlein et al. |
| 9,233,272 | B2 | 1/2016 | Villani et al. |
| 9,254,409 | B2 | 2/2016 | Dalebout et al. |
| D751,156 | S | 3/2016 | Tasca et al. |
| 9,305,141 | B2 | 4/2016 | Fabrizio |
| 9,314,667 | B2 | 4/2016 | Puerschel |
| 9,352,188 | B2 | 5/2016 | Astilean |
| 9,429,511 | B1 | 8/2016 | Kannel |
| 9,498,696 | B1 | 11/2016 | Razon |
| 9,595,855 | B2 | 3/2017 | Asai et al. |
| D788,792 | S | 6/2017 | Alessandri et al. |
| 9,694,234 | B2 | 7/2017 | Dalebout et al. |
| 9,713,742 | B2 | 7/2017 | Pasini et al. |
| 9,824,110 | B2 | 11/2017 | Giudici et al. |
| 9,914,015 | B2 | 3/2018 | Astilean et al. |

| | | | |
|---|---|---|---|
| 9,956,450 | B2 | 5/2018 | Bayerlein et al. |
| 9,974,997 | B2 | 5/2018 | Cei |
| D820,362 | S | 6/2018 | Citterio |
| 10,010,748 | B1 | 7/2018 | Weinstein et al. |
| D827,058 | S | 8/2018 | Lisi et al. |
| 10,143,884 | B2 | 12/2018 | Cei |
| D837,312 | S | 1/2019 | Lisi et al. |
| 10,183,191 | B2 | 1/2019 | Astilean et al. |
| 10,265,566 | B2 * | 4/2019 | Bayerlein .......... A63B 22/0023 |
| 10,293,204 | B2 | 5/2019 | Astilean et al. |
| D859,543 | S | 9/2019 | Lisi et al. |
| 10,434,354 | B2 * | 10/2019 | Bayerlein .............. A63B 23/04 |
| 10,478,666 | B2 | 11/2019 | Yoo |
| 10,561,883 | B2 | 2/2020 | Bayerlein et al. |
| 10,561,884 | B2 | 2/2020 | Bayerlein et al. |
| 10,709,926 | B2 | 7/2020 | Bayerlein et al. |
| 10,799,745 | B2 | 10/2020 | Bayerlein et al. |
| 10,850,150 | B2 | 12/2020 | Bayerlein et al. |
| D907,722 | S | 1/2021 | Fang |
| D930,089 | S | 9/2021 | Oblamski et al. |
| 11,179,589 | B2 | 11/2021 | Bayerlein et al. |
| 11,369,825 | B2 | 6/2022 | Holton |
| 11,465,005 | B2 * | 10/2022 | Bayerlein .......... A63B 21/0054 |
| 11,590,377 | B2 * | 2/2023 | Bayerlein ............ A63B 21/157 |
| 11,826,608 | B2 * | 11/2023 | Bayerlein .......... A63B 69/0057 |
| 2001/0018917 | A1 | 9/2001 | Brain |
| 2002/0147079 | A1 | 10/2002 | Kalnbach |
| 2003/0148853 | A1 | 8/2003 | Alessandri et al. |
| 2003/0186787 | A1 | 10/2003 | Wu et al. |
| 2004/0018917 | A1 | 1/2004 | Corbalis et al. |
| 2004/0077465 | A1 | 4/2004 | Schmidt |
| 2004/0087418 | A1 | 5/2004 | Eldridge |
| 2004/0097341 | A1 | 5/2004 | Alessandri et al. |
| 2004/0241631 | A1 | 12/2004 | Nizamuddin |
| 2004/0242631 | A1 | 12/2004 | Garlich et al. |
| 2004/0244521 | A1 | 12/2004 | Russ et al. |
| 2005/0009668 | A1 | 1/2005 | Savettiere et al. |
| 2005/0202936 | A1 | 9/2005 | Ota |
| 2005/0209059 | A1 | 9/2005 | Crawford et al. |
| 2005/0272562 | A1 | 12/2005 | Alessandri et al. |
| 2006/0003871 | A1 | 1/2006 | Houghton et al. |
| 2006/0003872 | A1 | 1/2006 | Chiles et al. |
| 2006/0122035 | A1 | 6/2006 | Felix |
| 2006/0287165 | A1 | 12/2006 | Pasqualin |
| 2007/0021278 | A1 | 1/2007 | Pan et al. |
| 2007/0027001 | A1 | 2/2007 | Alessandri et al. |
| 2007/0054781 | A1 | 3/2007 | Blaylock |
| 2007/0123396 | A1 | 5/2007 | Ellis |
| 2007/0167289 | A1 | 7/2007 | Alessandri et al. |
| 2007/0202995 | A1 | 8/2007 | Roman et al. |
| 2007/0225130 | A1 | 9/2007 | Maffei et al. |
| 2007/0298935 | A1 | 12/2007 | Badarneh et al. |
| 2008/0015094 | A1 | 1/2008 | Casagrande |
| 2008/0020907 | A1 | 1/2008 | Lin |
| 2008/0026914 | A1 | 1/2008 | Chen et al. |
| 2008/0119332 | A1 | 5/2008 | Roman |
| 2008/0132385 | A1 | 6/2008 | Alessandri et al. |
| 2008/0287266 | A1 | 11/2008 | Smith |
| 2009/0062165 | A1 | 3/2009 | Denis et al. |
| 2009/0105047 | A1 | 4/2009 | Guidi et al. |
| 2009/0156363 | A1 | 6/2009 | Guidi et al. |
| 2009/0170666 | A1 | 7/2009 | Chiang |
| 2009/0215589 | A1 | 8/2009 | Schoenenberger |
| 2009/0280960 | A1 | 11/2009 | Tian |
| 2010/0087298 | A1 | 4/2010 | Zaccherini |
| 2010/0216607 | A1 | 8/2010 | Mueller |
| 2010/0222182 | A1 | 9/2010 | Park |
| 2011/0027549 | A1 | 2/2011 | Boutaghou |
| 2011/0048809 | A1 | 3/2011 | Duckworth et al. |
| 2011/0266091 | A1 | 11/2011 | Taylor |
| 2011/0275497 | A1 | 11/2011 | Lorusso |
| 2011/0306527 | A1 | 12/2011 | Bouffet et al. |
| 2012/0010048 | A1 | 1/2012 | Bayerlein et al. |
| 2012/0010053 | A1 | 1/2012 | Bayerlein et al. |
| 2012/0019973 | A1 | 1/2012 | Ehrmantraut et al. |
| 2012/0149613 | A1 | 6/2012 | David et al. |
| 2012/0157267 | A1 | 6/2012 | Lo |
| 2012/0231934 | A1 | 9/2012 | Lo |
| 2012/0264569 | A1 | 10/2012 | Escobedo et al. |

(56) References Cited

U.S. PATENT DOCUMENTS

| | | | | |
|---|---|---|---|---|
| 2012/0270705 | A1 | 10/2012 | Lo | |
| 2013/0256064 | A1 | 10/2013 | Bongaerts et al. | |
| 2014/0011642 | A1 | 1/2014 | Astilean | |
| 2014/0080679 | A1 | 3/2014 | Bayerlein et al. | |
| 2014/0087922 | A1 | 3/2014 | Bayerlein et al. | |
| 2014/0171272 | A1 | 6/2014 | Hawkins et al. | |
| 2014/0213419 | A1 | 7/2014 | Bayerlein et al. | |
| 2014/0239760 | A1 | 8/2014 | Asai et al. | |
| 2015/0038297 | A1* | 2/2015 | Bayerlein .......... | A63B 22/0235 482/2 |
| 2015/0119202 | A1 | 4/2015 | Hendrickson et al. | |
| 2015/0157895 | A1 | 6/2015 | Bettini | |
| 2015/0210348 | A1 | 7/2015 | Astilean | |
| 2015/0258382 | A1 | 9/2015 | Nolan et al. | |
| 2015/0306456 | A1 | 10/2015 | Pasini et al. | |
| 2015/0352400 | A1 | 12/2015 | Bayerlein et al. | |
| 2015/0367175 | A1 | 12/2015 | Alessandri et al. | |
| 2016/0023039 | A1 | 1/2016 | Cei | |
| 2016/0067537 | A1* | 3/2016 | Bayerlein ............ | A63B 21/157 482/54 |
| 2016/0096064 | A1 | 4/2016 | Gatti | |
| 2016/0144224 | A1 | 5/2016 | Dalebout et al. | |
| 2016/0144225 | A1 | 5/2016 | Dalebout et al. | |
| 2016/0166877 | A1 | 6/2016 | Cei et al. | |
| 2016/0263429 | A1 | 9/2016 | Wagner | |
| 2016/0296789 | A1 | 10/2016 | Astilean et al. | |
| 2016/0367851 | A1 | 12/2016 | Astilean et al. | |
| 2017/0007886 | A1 | 1/2017 | Alessandri | |
| 2017/0113093 | A1 | 4/2017 | Bellavista et al. | |
| 2017/0128769 | A1 | 5/2017 | Long et al. | |
| 2017/0182356 | A1 | 6/2017 | Cei et al. | |
| 2017/0274248 | A1 | 9/2017 | Brown et al. | |
| 2017/0312582 | A1 | 11/2017 | Root, Jr. | |
| 2018/0001134 | A1 | 1/2018 | Bayerlein et al. | |
| 2018/0014755 | A1 | 1/2018 | Alessandri et al. | |
| 2018/0104534 | A1 | 4/2018 | Erkelenz et al. | |
| 2018/0111018 | A1 | 4/2018 | Lee | |
| 2018/0111023 | A1 | 4/2018 | Cei et al. | |
| 2018/0229065 | A1 | 8/2018 | Leonardi et al. | |
| 2018/0236291 | A1* | 8/2018 | Bayerlein .......... | A63B 22/0023 |
| 2018/0236292 | A1* | 8/2018 | Bayerlein .......... | A63B 22/0235 |
| 2018/0243598 | A1* | 8/2018 | Bayerlein .......... | A63B 21/0055 |
| 2019/0054344 | A1 | 2/2019 | Athey et al. | |
| 2019/0083843 | A1 | 3/2019 | Del Monaco et al. | |
| 2019/0083844 | A1 | 3/2019 | Bayerlein et al. | |
| 2019/0118030 | A1 | 4/2019 | Yoo | |
| 2019/0168067 | A1 | 6/2019 | Bates et al. | |
| 2019/0217153 | A1 | 7/2019 | Bayerlein et al. | |
| 2019/0314674 | A1 | 10/2019 | Chen | |
| 2019/0374811 | A1 | 12/2019 | Bayerlein et al. | |
| 2020/0086157 | A1* | 3/2020 | Bayerlein .......... | A63B 22/0285 |
| 2020/0139189 | A1 | 5/2020 | Bayerlein et al. | |
| 2020/0171353 | A1 | 6/2020 | Fima | |
| 2020/0179739 | A1* | 6/2020 | Bayerlein .......... | A63B 21/0054 |
| 2020/0179789 | A1 | 6/2020 | Fima | |
| 2020/0188760 | A1 | 6/2020 | Bandini et al. | |
| 2020/0215391 | A1 | 7/2020 | Paganelli et al. | |
| 2020/0254293 | A1 | 8/2020 | Bayerlein et al. | |
| 2021/0077846 | A1* | 3/2021 | Bayerlein .......... | A63B 21/0054 |
| 2022/0080245 | A1* | 3/2022 | Bayerlein .............. | A63B 22/02 |
| 2022/0233904 | A1* | 7/2022 | Bayerlein .......... | A63B 21/0055 |
| 2022/0314062 | A1* | 10/2022 | Bayerlein .......... | A63B 22/0285 |

FOREIGN PATENT DOCUMENTS

| | | | |
|---|---|---|---|
| CN | 201006229 | | 1/2008 |
| CN | 201030178 | | 3/2008 |
| CN | 201333278 | | 10/2009 |
| CN | 102309835 | A | 1/2012 |
| CN | 103656988 | A | 3/2014 |
| DE | 19922822 | A1 | 12/2000 |
| DE | 10 2005 009 414 | A1 | 9/2006 |
| DE | 20-2006-005995 | | 9/2006 |
| EP | 1 466 651 | A1 | 10/2004 |
| EP | 3 170 536 | A1 | 5/2017 |
| GB | 2 223 685 | A | 4/1990 |
| JP | 03-148743 | | 6/1991 |
| KR | 2009007043 | | 1/2009 |
| KR | 10-2016-0150084 | A | 12/2016 |
| WO | WO-2004/078272 | A2 | 9/2004 |
| WO | WO-2009/000014 | A1 | 12/2008 |
| WO | WO-2009/014330 | A1 | 1/2009 |
| WO | WO-2010/057238 | A2 | 5/2010 |
| WO | WO-2010/107632 | A1 | 9/2010 |
| WO | WO-2014/160057 | | 10/2014 |
| WO | WO-2016/163680 | A1 | 10/2016 |

OTHER PUBLICATIONS

U.S. Appl. No. 08/152,177, filed Nov. 12, 1993, Schonenberger et al.

U.S. Appl. No. 61/280,265, filed Nov. 2, 2009, Astilean, Aurel A.

“AirRunner The Premier Elite Fitness Running Machine” Brochure, Case No. 3:22-cv-00492-JO-BLM, filed Apr. 11, 2022, 3 pages.

“Browning Morse Mechanical Clutches and Torque Overload Devices”, Emerson Industrial Automation, 39 pages.

“Human-Powered Gyms in Hong Kong”, Webpage Article, Mar. 8, 2007, https://inhabitat.com/human-powered-gyms-in-hong-kong/, 2 pages.

“International Standard Stationary Training Equipment Part 6: Treadmills, additional specific requirements and test methods”, International Organization for Standardization, 2005, 18 pages.

“Mechanisms and Mechanical Devices Sourcebook 3rd ed.” Neil Sclater and Nicholas P. Chironis, McGraw Hill, Jan. 1, 2001, 25 pages.

“Power Transmission Handbook”, Power Transmission Distributors Association, Copyright 1993, 50 pages.

“Product Safety Treadmills Supplier Guide”, Australian Competition and Consumer Commission, Copyright 2010, 20 pages.

“Servo technology smooths treadmill ride”, DesignNews, Apr. 8, 2002, https://www.designnews.com/automation-motion-control/servo-technology-smooths-treadmill-ride/129729584441364, 10 pages.

“Standard Specification for Motorized Treadmills”, ASTM International, 7 pages.

“Stieber Clutch Overrunning Clutches and Backstops” Brochure, Altra Industrial Motion, Case No. 3:22-cv-00492-JO-BLM, filed Apr. 11, 2022, 101 pages.

“What is a Shaft? (All you need to know)”, Webpage Article dtd Oct. 24, 2022, Case No. 3:22-cv-00492-JO-BLM, Filed Mar. 1, 2023, 91 pages.

“What Is Bearing?—Parts, Types, and Application”, Webpage Article dtd Dec. 23, 2022, https://www.engineeringchoice.com/what-is-bearing/#:%E2%80%94:text=Ball, Case No. 3:22-cv-00492-JO-BLM, filed Mar. 1, 2023, 26 pages.

“Woodway Treadmill Speed/Current Relationship”, 2002, 3 pages.

“Woodway USA, Inc.’s Opening Claim Construction Brief”, United States District Court Southern District of California, Dated Mar. 1, 2023—16 pages.

“Woodway USA, Inc.’s Table of Contents to Exhibits In Support of Its Opening Claim Construction Brief”, United States District Court Southern District of California, Dated Mar. 1, 2023,—226 pages.

2001 Woodway USA—Treadmill Owner’s Manual.

Andrews et al., The Effect of an 80-Minute Intermittent Running Protocol on Hamstrings Strength Abstract, NSCA Presentation, Jul. 15, 2006, 1 page.

Answer to Counterclaims filed Nov. 14, 2014 between *Speedfit LLC and Aurel Astilean* versus *Woodway USA, Inc*., 8 pages.

Applicant-Initiated Interview on U.S. Appl. No. 14/832,708, Dtd Mar. 29, 2019.

Astilean, Alex, YouTube Video entitled “SpeedFit—Speedboard—First Curve Prototype” retrieved from the internet at: https://www.youtube.com/watch?v=dO9h-F-JVCU on Apr. 6, 2015, 49 pages of screenshots.

Baldor, AC Servo Control Installation and Operating Manual, MN766, 2007, 247 pages.

Baldor, Series 23H, AC Servo Control Operating Manual, 1999, 138 pages.

(56) References Cited

OTHER PUBLICATIONS

Biodex Medical Systems, Inc., "The Biodex RTM Rehabilitation Treadmill Operation Manual", believed to have published 2002, 48 pages.
Brughelli et al., Effects of Running Velocity on Running Kinetics and Kinematics, Journal of Strength and Conditioning Research, Apr. 2011, 7 pages.
Buchheit et al., "Assessing Stride Variables and Vertical Stiffness with GPS-Embedded Accelerometers: Preliminary Insights for Monitoring of Neuromuscular Fatigue on the Field", Dec. 2015.
Chapco, Inc. and Samsara Fitness LLC's notice pursuant to 34 U.S.C. §282, Case 3:15-CV-01665-JCH, Document 310, filed Sep. 14, 2018, 4 pps.
Claim Construction Brief of Defendant, LifeCORE Fitness, Inc., Case No. 3:22-cv-00492-JO-BLM, Filed Mar. 1, 2023, 29 pages.
Claim Construction Order, *Speedfit LLC and Aurel A. Astilean* v. *Woodway USA, Inc*., Docket No. 2:13-cv-01276-KAM-AKT, Nov. 20, 2017, 23 pages.
Complaint between *Woodway USA, Inc.* versus *LifeCORE Fitness, Inc. d/b/a Assault Fitness*, 3:22-cv-00492-JO-BLM, Filed Apr. 11, 2022, 8 pages.
Complaint for Declaratory Judgment of Patent Invalidity and Correction of Inventorship, *Woodway USA, Inc.* v. *Aurel A. Astilean*, Civ. Dkt. No. 2:13-cv-00681-WEC (E.D. WI), Jun. 13, 2013, 6 pages.
Coolthings, "Woodway EcoMill: A Non-Motorized Treadmill with Electronic Displays", Jun. 4, 2009, https://www.coolthings.com/woodway-ecomill-a-non-motorized-treadmill-with-electronic-displays/, 1 page.
Curvature, http://en.wikipedia.org/wiki/Curvature, Mar. 3, 2010, 1 page.
Decision and Order Denying Defendant's Motion to Dimiss or to Transfer and Staying Case Pending Decision from Eastern District New York District Court, *Woodway USA, Inc.* v. *Aurel A. Astilean*, Civ. Dkt. No. 2:13-cv-00681-WEC (E.D. WI), Dec. 18, 2013, 7 pages.
Declaration of Ashley M. Koley in Support of Woodway USA, Inc.'s Responsive Claim Construction Brief, Case No. 3:22-cv-00492-JO-BLM, Filed Mar. 14, 2023, 3 pages.
Declaration of Aurel A. Astilean filed Jun. 15, 2015 between *Speedfit LLC and Aurel Astilean* versus *Woodway USA, Inc.* and Exhibit A.
Declaration of *Aurel A. Astilean, Speedfit LLC and Aurel A. Astilean* v. *Woodway USA, Inc*., Docket No. 2:17-cv-00768-KAM-AKT, Exhibit 1, Mar. 26, 2018, 5 pages.
Declaration of Dan Bostan filed Jun. 15, 2015 between *Speedfit LLC and Aurel Astilean* versus *Woodway USA, Inc.* and Exhibit A.
Declaration of John F. Vodopia filed Jun. 6, 2017.
Declaration of John F. Vodopia in Further Support of Plaintiffs' Motion for Leave to Amend filed Jul. 7, 2015 and Exhibits A-C.
Declaration of John F. Vodopia In Support of Plaintiffs' motion for Leave to Amend filed Jul. 7, 2017 and Exhibits A-F.
Declaration of John F. Vodopia in Support of Plaintiffs' Motion Under 35 USC 256 to Correct Inventorship of U.S. Pat. No. 8,308,619 and U.S Pat. No. 8,342,016 filed Jun. 15, 2015 between *Speedfit LLC and Aurel Astilean*versus *Woodway USA, Inc.* and Exhibits A-H.
Declaration of John Halan in Support of Claim Construction Brief of LifeCORE Fitness, Inc. and Table of Contents to Exhibits, Case No. 3:22-cv-00492-JO-BLM, Filed Mar. 1, 2023, 3 pages.
Declaration of Kadie M. Jelenchick filed Jul. 7, 2015 and Exhibits A-G.
Declaration of Kadie M. Jelenchick filed Jun. 15, 2015 and Exhibits A, B and E.
Declaration of Kadie M. Jelenchick filed Jun. 6, 2017.
Declaration of Matthew W. Peters, Case 2:13-cv-01276-KAM-AKT, Document 213, filed Aug. 8, 2018, 2 pps.
Declaration of Nicholas Oblamski filed Jun. 15, 2015, and Exhibit A, 11 pages.
Declaration of Nicholas Oblamski, *Speedfit LLC and Aurel A. Astilean* v. *Woodway USA, Inc*., Docket No. 2:17-cv-00768-KAM-AKT, Exhibit 1, Mar. 26, 2018, 12 pages.
Declaration of Robert Giachetti, Case 3:15-CV-01665-JCH, Document 88-2, filed May 1, 2017, 20 pps., marked on its face as Exhibit 1.
Declaration of Robert Giachetti, Ph.D. on IPR2023-00836, dtd Apr. 11, 2023, 281 pages.
Declaration of Robert Giachetti, Ph.D. on IPR2023-00843, dtd Apr. 12, 2023, 250 pages.
Declaration of Robert Giachetti, Ph.D. on IPR2023-00849, dtd Apr. 13, 2023, 253 pages.
Declaration of Thomas B. Decea filed Nov. 19, 2015 between *Speedfit LLC and Aurel Astilean* versus *Woodway USA, Inc.*
Defendant Woodway USA, Inc.'s responses and objections to plaintiffs' first set of interrogatories, Case 3:15-CV-01665-JCH, Document 254-22, 17 pps., marked on its face as Exhibit 22.
Discovery Channel, "Wreckreation Nation", Season 1, Episode 8, first aired Feb. 24, 2009, 9 pages of screenshot excerpts.
Docket Report, *Speedfit LLC and Aurel A. Astilean* v. *Douglas G. Bayerlain*, Civ. Dkt. No. 2:13-cv-01276-KAM-AKT (E.D.N.Y.), Dec. 19, 2013, 8 pages.
Docket Report, *Woodway USA, Inc.* v. *Aurel A. Astilean*, Civ. Dkt. No. 2:13-cv-00681-WEC (E.D. WI), Dec. 19, 2013, 3 pages.
EMS-Grivory Grivory GV-5H Black 9915 Nylon Copolymer, 50% Glass Fiber Filled, As Conditioned, believed to be publically available before Sep. 16, 2011, 2 pages.
EP Notice of Opposition for European Application No. 17738027.6 dated May 4, 2022, 32 pages.
Excerpt from U.S. Appl. No. 14/076,912, Exhibit F, *Speedfit LLC and Aurel A. Astilean* v. *Woodway USA, Inc*., Docket No. 2:17-cv-00768-KAM-AKT, Mar. 26, 2018, 4 pages.
Expert report of Dr. Robert Giachetti, Case 3:15-CV-01665-JCH, Document 216-2, filed Apr. 5, 2018, 31 pps., marked on its face as Exhibit 2.
Expert report of James D. Whelan, P.E., report dated Aug. 26, 2015, Case 2:13-cv-01276-KAM-AKT, Document 212-2, filed Aug. 8, 2018, 19 pps., marked on its face as Exhibit 2.
Expert report of James D. Whelan, P.E., report dated Jul. 27, 2015, Case 2:13,cv-01276-KAM-AKT, Document 212-1, filed Aug. 8, 2018, 62 pps., marked on its face as Exhibit 1.
Expert report of James D. Whelan, P.E., report dated Jun. 12, 2018, 30 pps.
Expert report of James D. Whelan, P.E., report dated Sep. 28, 2018, 10 pps.
Expert Report of Kim B. Blair, Ph.D., Case 3:15-CV-01665-JCH, Document 254-7, filed Jun. 8, 2018, 135 pps., marked on its face as Exhibit 7.
Extended European Search Report for Application No. EP 21181423.1 mailing date Sep. 21, 2021, 9pages.
Final Office Action on U.S. Appl. No. 14/243,716, mail date Oct. 17, 2014, 17 pages.
Final Office Action on U.S. Appl. No. 15/957,721 Dtd Mar. 8, 2019.
Final Office Action on U.S. Appl. No. 15/958,339 Dtd Feb. 20, 2019.
Final Office Action on U.S. Appl. No. 15/966,598 Dtd Mar. 6, 2019.
Final Office Action on U.S. Appl. No. 16/792,444 Dtd Jul. 31, 2020.
Final Office Action on U.S. Appl. No. 14/832,708 dated May 19, 2017 (8 pages).
Final Office Action on U.S. Appl. No. 14/941,342 dated Dec. 9, 2016 (8 pages).
First Amended Complaint (Jury Trial Demanded), *Speedfit LLC and Aurel A. Astilean* v. *Douglas G. Bayerlein*, Civ. Dkt. No. 2:13-cv-01276-KAM-AKT (E.D.N.Y.), Jun. 17, 2013, 16 pages.
First Amended Complaint filed Jun. 17, 2013 between *Speedfit LLC and Aurel Astilean* versus *Woodway USA, Inc*., 16 pages.
Foreign Action other than Search Report on CA 3029593 Dtd Nov. 21, 2019.
Hall, The Rotary Treadwheel, available at least as early as Nov. 2011, 1 page.
HDT Expeditionary Systems, Inc., "KineAssist-MX Owner's Manual vG", 2015, 73 pages.

(56) References Cited

OTHER PUBLICATIONS

Hersher, Perfect Landing, http://news.harvard.edu/gazette/story/2010/01/different-strokes/, Jan. 27, 2010, 5 pages.
Hersher, Perfect Landing, http://news.harvard.edu/gazette/story/2010/01/different-strokes/, Feb. 26, 2010, 5 pages.
Hopker et al., Familiarisation and Reliability of Sprint Test Indices During Laboratory and Field Assessment, Journal of Sports Science and Medicine, Dec. 1, 2009, 5 pages.
http://www.gettyimages.com/detail/463782507, Animal treadmill c. 1872, Museum of Science and Industry, Chicago, 3 pps.
http://www.gettyimages.com/license/542395667, 1930 era treadmill, 1 page.
http://www.mpiwg-berlin.mpg.de/resrep00_01/Jahresbericht_2_2_section.html, 27 pps.
Integrated Performance Systems, LLC, Conditioning in a Professional Athlete Case Study, 2005, 1 page.
Integrated Performance Systems, LLC, Lower Extremity Rehabilitation & Assessment Case Study, 2005, 2 pages.
Integrated Performance Systems, LLC, Youth Athlete-Speed Training Case Study, 2005, 2 pages.
International Preliminary Report for Application No. PCT/US2010/026731, mail date Sep. 29, 2011, 7 pages.
International Preliminary Report for Application No. PCT/US2010/027543, mail date Sep. 29, 2011, 9 pages.
International Search Report and Written Opinion for Application No. PCT/US2010/026731, mail date May 4, 2010, 8 pages.
International Search Report and Written Opinion for Application No. PCT/US2010/027543, mail date May 12, 2010, 10 pages.
International Search Report and Written Opinion for International Application No. PCT/US2016/055572, dated Feb. 17, 2017, 9 pages.
International Search Report, PCT/US2017/040449, Oct. 11, 2017, 6 pages.
International Standard ISO 20957-6:2005(E), for Stationary training equipment—Part 6: Treadmills, additional specific safety requirements and test methods, First edition May 1, 2005, 18pps.
Introducing the New Force 3 Treadmill Advanced Analysis Package, www.fittech.com.au, believed to be publically available before Sep. 16, 2011, 3 pages.
Joint Claim Construction Chart Pursuant to Patent L.R. 42, Case No. 3:22-cv-00492-JO-BLM, Filed Jan. 19, 2023, 30 pages.
Joint Claim Construction Worksheet Pursuant to Patent L.R. 42, Case No. 3:22-cv-00492-JO-BLM, Filed Jan. 19, 2023, 6 pages.
Joint Disputed Claim filed Apr. 19, 2017 between *Speedfit LLC and Aurel Astilean* versus *Woodway USA, Inc.*, 10 pages.
Joint Notice With Requested Office Action, Case No. 3:22-cv-00492-JO-BLM, Filed Apr. 21, 2023, 4 pages.
Lieberman et al., Running Barefoot, Forefoot Striking & Training Tips, http://www.barefootrunning.fas.harvard.edu/5BarefootRunning&TrainingTips.html, Feb. 26, 2010, 5 pages.
Lieberman et al., Running Barefoot: Biomechanics of Foot Strike, http://www.barefootrunning.fas.harvard.edu/4BiomechanicsofFootStrike.html, Feb. 26, 2010, 6 pages.
Lieberman et al., Running Barefoot: Biomechanics of Foot Strikes & Applications to Running Barefoot or in Minimal Footwear, http://www.barefootrunning.fas.harvard.edu/index.html, Feb. 26, 2010, 2 pages.
Lieberman et al., Running Barefoot: FAQ, http://www.barefootrunning.fas.harvard.edu/6FAQ.html, Feb. 26, 2010, 3 pages.
Lieberman et al., Running Barefoot: Heel Striking & Running Shoes, http://www.barefootrunning.fas.harvard.edu/2FootStrikes&RunningShoes.html, Feb. 26, 2010, 2 pages.
Lieberman et al., Running Barefoot: Running Before the Modern Shoe, http://www.barefootrunning.fas.harvard.edu/3RunningBeforeTheModernShoe.html, Feb. 26, 2010, 4 pages.
Lieberman et al., Running Barefoot: Why Consider Foot Strike, http://www.barefootrunning.fas.harvard.edu/1WhyConsiderFootStrike.html, Feb. 26, 2010, 1 page.
LifeCORE Fitness, Inc. d/b/a Assault Fitness's Answer to Complaint and Counterclaims, Case No. 3:22-cv-00492-JO-BLM, Filed Jun. 13, 2022, 30 pages.
LifeCORE Fitness, Inc. d/b/a Assault Fitness's Answer to Plaintiff's First Amended and Supplemental Complaint, Case No. 3:22-cv-00492-JO-BLM, Filed Nov. 7, 2022, 39 pages.
LifeCORE Fitness, Inc. d/b/a Assault Fitness's Claim Construction Brief of Defendant, Case No. 22-cv-492-JO-BLM, Filed Mar. 1, 2023, 29 pages.
LifeCORE Fitness, Inc. d/b/a Assault Fitness's Responsive Claim Constructions and Identifications of Extrinsic Evidence of Defendant, Case No. 22-cv-492-JO-BLM, Jan. 15, 2023, 6 pages.
Liszewski, Andrew, "EcoMill Treadmill Generates Its Own Power", Jun. 1, 2009, http://www.ohgizmo.com/2009/06/04/ecomill-treadmill-generates-its-own-power/, 1 page.
Memorandum and Order filed Dec. 28, 2016 between *Speedfit LLC and Aurel Astilean* versus *Woodway USA, Inc.*, 22 pages.
Memorandum and Order filed Oct. 10, 2014 between *Speedfit LLC and Aurel Astilean* versus *Woodway USA, Inc.*, 39 pages.
Memorandum and Order filed Oct. 19, 2015 between *Speedfit LLC and Aurel Astilean* versus *Woodway USA, Inc.*, 11 pages.
Memorandum of Law in Support of Plaintiffs' Motion for Leave to Amend the Second Amended Complaint filed Jul. 7, 2015, 13 pages.
Memorandum of Law in Support of Plaintiffs' Motion Under 35 USC 256 to Correct Inventorship of SPN 8,308,619 and U.S. Pat. No. 8,342,016 between *Speedfit LLC and Aurel Astilean* versus *Woodway USA, Inc.*, 14 pages.
Minute Entry and Order for Markman Hearing, dated Jun. 13, 2018, 2 pps.
Minute Entry for Proceedings on Nov. 10, 2015 and Exhibit G.
Minute Order Regarding Claim Construction, *Speedfit LLC* v. *Woodway*, Docket No. 2:17-cv-00768-KAM-AKT, Jun. 13, 2018, 2 pages.
Mitsubishi Electric, Melservo-J2 Super Series: Servo Amplifier Instruction Manual, 2007, 402 pages.
Moody, The Effects Resisted Sprint Training on Speed, Agility and Power Production in Young Athletes, believed to be publically available before Dec. 31, 2006, 5 pages.
Motion to Dismiss filed Oct. 30, 2015 and Exhibits A-H.
NASA, "Combined Operational Load Bearing External Resistance Treadmill (Colbert)", Aug. 2009, 3 pages.
NASA, "International Space Station: Combined Operational Load Bearing External Resistance Treadmill (Colbert)", Jul. 19, 2017, https://www.nasa.gov/mission_pages/station/research/experiments/765.html, 4 pages.
NASA, "International Space Station: Do Tread on Me", Aug. 19, 2009, https://www.nasa.gov/mission_pages/station/behindscenes/colbert_feature.html, 2 pages.
NASA, "International Space Station: Treadmill with Vibration Isolation and Stabilization System (TVIS)", May 17, 2018, https://www.nasa.gov/mission_pages/station/research/experiments/976.html, 5 pages.
NASA, "Space Shuttle Mission STS-128: Racking Up New Science", Press Kit, Aug. 2009, 116 pages.
Nexus Resin Group, 10124 Antistat, believed to be publically available before Sep. 16, 2011, 2 pages.
Non-Final Office Action on U.S. Appl. No. 12/243,716, mail date Jun. 11, 2014, 14 pages.
Non-Final Office Action on U.S. Appl. No. 14/517,478 Dated Apr. 30, 2015, 9 pages.
Non-Final Office Action on U.S. Appl. No. 14/941,342, mail date May 13, 2016, 9 pages.
Non-Final Office Action on U.S. Appl. No. 15/958,339 dtd Jul. 19, 2018, Case No. 3:22-cv-00492-JO-BLM, filed Mar. 1, 2023, 11 pages.
Non-Final Office Action on U.S. Appl. No. 15/765,681 Dtd Dec. 6, 2019.
Non-Final Office Action on U.S. Appl. No. 15/957,721 Dtd Jul. 12, 2018.
Non-Final Office Action on U.S. Appl. No. 15/957,721 Dtd Aug. 5, 2019.
Non-Final Office Action on U.S. Appl. No. 15/958,339 Dtd Jul. 19, 2018.

(56) References Cited

OTHER PUBLICATIONS

Non-Final Office Action on U.S. Appl. No. 15/958,339 Dtd Aug. 5, 2019.
Non-Final Office Action on U.S. Appl. No. 15/966,598 Dtd Jul. 17, 2018.
Non-Final Office Action on U.S. Appl. No. 16/732,981 Dtd Sep. 7, 2021.
Non-Final Office Action on U.S. Appl. No. 16/792,426 Dtd May 22, 2020.
Non-Final Office Action on U.S. Appl. No. 16/792,444 Dtd Mar. 27, 2020.
Non-Final Office Action on U.S. Appl. No. 17/247,101 Dtd May 20, 2022.
Non-Final Office Action on U.S. Appl. No. 17/532,212 Dtd May 26, 2023.
Non-Final Office Action on U.S. Appl. No. 17/721,022 Dtd Jun. 22, 2022.
Non-Final Office Action on U.S. Appl. No. 29/806,610 Dtd Jun. 27, 2023.
Notice of Allowance on U.S. Appl. No. 13/235,065, mail date Oct. 10, 2014, 10 pages.
Notice of Allowance on U.S. Appl. No. 13/257,038, mail date Jul. 17, 2014, 5 pages.
Notice of Allowance on U.S. Appl. No. 29/534,417 mail date Nov. 20, 2015, 8 pages.
Notice of Allowance on U.S. Appl. No. 13/235,065 Dated Feb. 4, 2015, 5 pages.
Notice of Allowance on U.S. Appl. No. 14/243,716 Dated Feb. 2, 2015, 5 pages.
Notice of Allowance on U.S. Appl. No. 29/506,302 Dated Apr. 24, 2015, 9 pages.
Notice of Allowance on U.S. Appl. No. 29/534,421, mail date Nov. 30, 2015, 8 pages.
Notice of Allowance on U.S. Appl. No. 14/832,708 Dtd Feb. 27, 2019.
Notice of Allowance on U.S. Appl. No. 14/832,708 Dtd Aug. 1, 2018.
Notice of Allowance on U.S. Appl. No. 15/765,681 Dtd Mar. 16, 2020.
Notice of Allowance on U.S. Appl. No. 15/765,681 Dtd Jun. 15, 2020.
Notice of Allowance on U.S. Appl. No. 15/957,721 Dtd Jan. 2, 2020.
Notice of Allowance on U.S. Appl. No. 15/958,339 Dtd Jan. 3, 2020.
Notice of Allowance on U.S. Appl. No. 15/966,598 Dtd May 28, 2019.
Notice of Allowance on U.S. Appl. No. 16/595,076.
Notice of Allowance on U.S. Appl. No. 16/792,426 Dtd Aug. 28, 2020.
Notice of Allowance on U.S. Appl. No. 16/792,444 Dtd Oct. 14, 2020.
Notice of Allowance on U.S. Appl. No. 16/792,444 Dtd Oct. 28, 2020.
Notice of Allowance on U.S. Appl. No. 16/792,444 Dtd Nov. 4, 2020.
Notice of Allowance on U.S. Appl. No. 17/247,101 Dtd Aug. 31, 2022.
Notice of Allowance on U.S. Appl. No. 17/721,022 Dtd Nov. 4, 2022.
Notice of Allowance on U.S. Appl. No. 17/849,313 dated Mar. 29, 2023 (13 pages).
Notice of Allowance on U.S. Appl. No. 17/849,313 Dtd Jul. 25, 2023.
Notice of Allowance on U.S. Appl. No. 29/683,351 Dtd May 10, 2021.
Notice of Motion filed Jul. 7, 2015 between *Speedfit LLC and Aurel Astilean* versus *Woodway USA, Inc.*, 2 pages.
Notice of Motion Under 35 USC 256 to Correct Inventorship of U.S. Pat. No. 8,308,619 and U.S. Pat. No. 8,342,016 filed Jun. 15, 2015 between *Speedfit LLC and Aurel Astilean* versus *Woodway USA, Inc.*, 3 pages.
Notice of Woodway USA, Inc.'s Motion for Summary Judgment of Invalidity of U.S. Pat. Nos. 8,308,619 and 8,343,016 filed Jun. 5, 2017, 9 pages.
Notice of Woodway USA, Inc.'s motion to preclude the testimony of plaintiffs' technical expert James Whelan, Case 2:13-cv-01276-KAM-AKT, Document 211, filed Aug. 8, 2018, 3 pps.
Office Action for U.S. Appl. No. 13/235,065, mail date Aug. 14, 2013, 14 pages.
Office Action for U.S. Appl. No. 13/235,065, mail date Mar. 22, 2013, 15 pages.
Opening expert report of Dr. Robert Giachetti re: invalidity of U.S. Pat. No. 8,986, 169 and U.S. Pat. No. 9,039,580, Case 3:15-CV-01665-JCH, Document 216-1, filed Apr. 5, 2018, 67 pps., marked on its face as Exhibit 1.
Order Denying Motion for Reconsideration (Doc. No. 248), dated Jun. 20, 2018, 12 pps.
OSHA 1926.307, 9 pps.
Owners Manual for NordicTrack WalkFit Classic Treadmill, received on Mar. 2, 2017, 30 pps.
Owners Manual, Force 1, Nov. 29, 2007, 44 pages.
Owners Manual, Force 3, Jan. 28, 2009, 45 pages.
Owners Manual, The Force, Dec. 18, 2008, 68 pages.
Petition for Inter Partes Review Under 35 U.S.C. Sec. 311 Et Seq. and 37 C.F.R. Sec. 42.100 Et Seq. on U.S. Pat. No. 10,561,884, IPR2023-00843, dtd Apr. 12, 2023, 131 pages.
Petition for Inter Partes Review Under 35 U.S.C. Sec. 311 Et Seq. and 37 C.F.R. Sec. 42.100 Et Seq. on U.S. Pat. No. 10,799,745, IPR2023-00849, dtd Apr. 13, 2023, 134 pages.
Petition for Inter Partes Review Under 35 U.S.C. Sec. 311 Et Seq. and 37 C.F.R. Sec. 42.100 Et Seq. on U.S. Pat. No. 9,039,580, IPR2023-00836, dtd Apr. 11, 2023, 128 pages.
Photographs of public display of Speedfit Speedboard by Woodway presented at IHRSA Tradeshow on Mar. 17, 2009, 8 pages.
Photographs produced to Woodway at least by Nov. 10, 2014 in litigation, *Speedfit LLC and Aurel A. Astilean* v. *Woodway USA, Inc.*, No. 2:13-cv-01276-KAM-AKT, 11 pages.
Plaintiff's memorandum in support of motion for summary judgment of non-infringement and invalidity on Claim 25 of U.S. Pat. No. 9,039,580, Case 3:15-CV-01665-JCH, Document 253, filed Jun. 8, 2018, 45 pps.
Plaintiff's Reply to Defendant Woodway's Answer, Affirmative Defenses and Counter-Claims to Plaintiffs' Supplemental Complaint filed Mar. 17, 2017, 8 pages.
Plaintiff's Reply to Defendant Woodway's Answer, Affirmative Defenses and Counterclaims to Plaintiff's Second Amended Complaint filed Mar. 27, 2015, 6 pages.
Plaintiff's supplemental responses and objections to defendant's first set of interrogatories, Case 2:17-cv-00768-KAM-AKT, Document 38-3, filed Mar. 14, 2018, 22 pps., marked on its face as Exhibit C.
Plaintiffs Memorandum of Law in Opposition to Woodway's Motion for Summary Judgement of Invalidity and Opening Claim Construction Brief, Cross-Motion for Summary Judgment Upholding Validity, Cross-Motion for Summary Judgment for Infringement and Motion to Extend the Page Limitation for this Memorandum filed Jun. 6, 2017, 46 pages.
Plaintiffs' Initial Claims Construction Memorandum filed Jul. 31, 2017.
Plaintiffs' Local Rule 56(a)1 statement of undisputed material facts, Case 3:15-CV-01665-JCH, Document 254, filed Jun. 8, 2018, 14 pps.
Plaintiffs' Local Rule 56(a)2 statement of facts in opposition to summary judgment, Case 3:15-CV-01665-JCH, Document 265, filed Jun. 29, 2018, 17 pps.
Plaintiffs' Memorandum of Law in further Opposition to Defendant's Motion to Dismiss Certain of Plaintiffs' Claims filed Nov. 19, 2015, 19 pages.

(56) References Cited

OTHER PUBLICATIONS

Plaintiffs' memorandum of law in support of their motion for partial reconsideration, Case 3:15-CV-01665-JCH, Document 249, filed May 8, 2018, 9 pps.
Plaintiffs' motion for partial reconsideration, Case 3:15-CV-01665-JCH, Document 248, filed May 7, 2018, 3 pps.
Plaintiffs' motion for summary judgment of non-infringement and invalidity on Claim 25 of U.S. Pat. No. 9,039,580, Case 3:15-CV-01665-JCH, Document 252, 2 pps.
Plaintiffs' Opposition to Woodway USA, Inc.'s motion for summary judgment of infringement on Claim 25 of U.S. Pat. No. 9,039,580, Case 3:15-CV-01665-JCH, Document 264, filed Jun. 29, 2018, 35 pps.
Plaintiffs' preliminary invalidity contentions, Case 3:15-CV-01665-JCH, Document 254-16, filed Jun. 8, 2018, 205 pps., marked on its face as Exhibit 16.
Plaintiffs' preliminary non-infringement contentions, Case 3:15-cv-01165-JCH, Document 96-3, filed May 2, 2017, 56 pps.
Plaintiffs' Reply in Support of motion for partial reconsideration, Case 3:15-CV-01665-JCH, Document 251, filed May 29, 2018, 4 pps.
Plaintiffs' supplemental non-infringement contentions, Case 3:15-CV-01665-JCH, Document 98-8, filed May 2, 2017, 60 pps.
Plantar Fascia, http://en.wikipedia.org/wiki/Plantar_fascia, Mar. 3, 2010, 3 pages.
Rebuttal expert report of Kim B. Blair, Ph.D., Case 2:13-cv-01276-KAM-AKT, Document 213-3, filed Aug. 8, 2018, 24 pps., marked on its face as Exhibit C.
Rebuttal Expert Report of Kim B. Blair, Ph.D., Case 3:15-CV-01665-JCH, Document 254-15, 184 pps., marked on its face as Exhibit 15.
Reply in Opposition to D126 filed Nov. 6, 2015 and Exhibits A and B.
Reply Memorandum of Law in Further Support of Plaintiffs' Motion for Leave to Amend the Second Amended Complaint filed Jul. 7, 2015 between *Speedfit LLC and Aurel Astilean* versus *Woodway USA, Inc.*, 13 pages.
Response dtd Apr. 22, 2019, 2018 to Final Office Action on U.S. Appl. No. 15/958,339 dtd Feb. 20, 2019, Case No. 3:22-cv-00492-JO-BLM, filed Mar. 1, 2023, 25 pages.
Response dtd Oct. 18, 2018 to Non-Final Office Action on U.S. Appl. No. 15/958,339 dtd Jul. 19, 2018, Case No. 3:22-cv-00492-JO-BLM, filed Mar. 1, 2023, 23 pages.
Response in Opposition re [117] First Motion to Amend Second Amended Complaint filed Jul. 7, 2015, 2 pages.
Response in Opposition to [110] Motion to Amend-Corret-Supplement filed Jun. 15, 2015, 2 pages.
Restriction Requirement on U.S. Appl. No. 29/683,351 dated Sep. 21, 2020 (4 pages).
Restriction Requirement on U.S. Appl. No. 29/806,610 dated Jan. 18, 2023 (5 pages).
Revised Answer to Counterclaims filed Dec. 12, 2014 between *Speedfit LLC and Aurel Astilean* versus *Woodway USA, Inc.*, 5 pages.
Ross et al., The Effects of Treadmill Sprint Training and Resistance Training on Maximal Running Velocity and Power, National Strength and Conditioning Association, Mar. 2009, 10 pages.
Rule 56.1 Counter-Statement by Plaintiffs Speedfit LLC, and Aurel A. Astilean filed Jun. 6, 2017, 13 pages.
Ruling Re: Plaintiffs' Motion for Summary Judgment of Non-Infringement and Invalidity (Doc. No. 252) and Woodway's Motion for Summary Judgment of Infringement (Doc. No. 255), *Chapco, Inc. and Samsara Fitness, LLC* v. *Woodway USA, Inc.*, Docket No. 3:15-cv-01665-JCH, Jul. 24, 2018, 26 pages.
Sears, Roebuck and Co., 1986 Spring Summer Centennial Edition Catalog, Jan. 1, 1985, Curved Exerciser models 1 and 2 on pp. 496 and 497.
Second Amended Complaint filed Feb. 17, 2015 between *Speedfit LLC and Aurel Astilean* versus *Woodway USA, Inc.*, 18 pages.
Second Supplemental Expert Report of Kim B. Blair, PhD., Case 3:15-cv-01665-JCH, Document 254-3, 41 pps., marked on its face as Exhibit 3.
Selection From "An Introduction to Mechanical Engineering" 4th Edition, Jonathan Wickert and Kemper Lewis, pp. 167-171, Case No. 3:22-cv-00492-JO-BLM, Filed Mar. 1, 2023, 6 pages.
Sirotic et al., Physiological and Performance Test Correlates of Prolonged, High-Intensity, Intermittent Running Performance in Moderately Trained Women Team Sport Athletes, Journal of Strength and Conditioning Research, 2007, 7 pages.
Sirotic et al., The Reliability of Physiological and Performance Measures During Simulated Team-Sport Running on a Non-Motorised Treadmill, Journal of Science and Medicine in Sport, Apr. 11, 2007, 10 pages.
Soccer International, The Red Devil's in the Details, dated Jun. 2010, 4 pages.
Southern Research et al., "AIMTech Project Brief", Oct. 20, 2015, 2 pages.
Southern Research et al., "Resist Force-Induced Treadmill", 2 pages.
Speedfit LLC's Opening Claim Construction Brief, *Speedfit LLC and Aurel A. Astilean* v. *Woodway USA, Inc.*, Docket No. 2:17-cv-00768-KAM-AKT, Mar. 26, 2018, 9 pages.
Speedfit, video produced to Woodway at least by Apr. 28, 2015 in litigation, a copy of which is submitted herewith on DVD, *Speedfit LLC and Aurel A. Astilean* v. *Woodway USA, Inc.*
Speedfit, video produced to Woodway at least by Nov. 10, 2014 in litigation, *Speedfit LLC and Aurel A. Astilean* v. *Woodway USA, Inc.*, No. 2:13-cv-01276-KAM-AKT, 21 pages of screenshot excerpts.
Speedfit, video produced to Woodway at least by Nov. 10, 2014 in litigation, *Speedfit LLC and Aurel A. Astilean* v. *Woodway USA, Inc.*, No. 2:13-cv-01276-KAM-AKT, 23 pages of screenshot excerpts.
Supplemental Complaint filed Feb. 10, 2017 between *Speedfit LLC and Aurel Astilean* versus *Woodway USA, Inc.*
Supplemental Declaration of Kadie M. Jelenchick filed June 6.
Supplemental declaration of Matthew W. Peters, Case 2:13-cv-01276-KAM-AKT, Document 227, filed Aug. 8, 2018, 1 pg.
Supplemental Expert Report of Kim B. Blair, PhD., Case 3:15-CV-01665-JCH, Document 184-8, filed Mar. 16, 2018, 19 pps., marked on its face as Exhibit AA.
Supplemental rebuttal expert report of Dr. Robert Giachetti responsive to second supplemental expert report of Dr. Kim Blair dated Apr. 13, 2018, Case 3:15-CV-01665-JCH, Document 254-4, filed Jun. 8, 2018, 18 pps., marked on its face as Exhibit 4.
Supplemental rebuttal expert report of Dr. Robert Giachetti responsive to supplemental expert report of Dr. Kim Blair dated Mar. 15, 2018, dated May 14, 2018, 12 pps.
SV-M & SV-S Servies Servo Drive User Guide, 1998, 121 pages.
Tecmachine, "Sprint Club: User's Guide", believed to have published 2002, 33 pages.
The Australian Competition & Consumer Commission's Mandatory Safety Standard For Treadmills (Supplier Guide), 2009, 20 pps.
The Woodway Force Brochure, The Best Way to Train for Speed & Athletic Power, dated May 5, 2005, 2 pages.
Third Amended Complaint filed Oct. 23, 2015 between *Speedfit LLC and Aurel Astilean* versus *Woodway USA, Inc.* and Exhibits A-H.
Transcript of civil cause for evidentiary hearing before the Honorable Kiyo A. Matsumoto, United States District Judge, Case 2:13-cv-01276-KAM-AKT, Document 213-4, filed Aug. 8, 2018, 10 pps., marked on its face as Exhibit D.
Transcript of civil cause for evidentiary hearing before the Honorable Kiyo A. Matsumoto, United States District Judge, Case 2:13-cv-01276-KAM-AKT, Document 227-3, filed Aug. 8, 2018, 5 pps., marked on its face as Exhibit G.
Transcript of videotaped deposition of Alex Astilean taken Jul. 10, 2018 for Case 2:17-cv-00768-KAM-AKT, 75 pps.
Transcript of videotaped deposition of Dan Bostan, Case 2:13-cv-01276-KAM-AKT, Document 227-2, filed Aug. 8, 2018, 4 pps., marked on its face as Exhibit F.
Transcript of videotaped deposition of Speedfit LLC by Alex Astilean taken Jul. 10, 2018 for Case 2:17-cv-00768-KAM-AKT, 38 pps.

(56) References Cited

OTHER PUBLICATIONS

U.S. Appl. No. 61/161,027 and Related Correspondence, Case No. Case 2:17-cv-00768-KAM-AKT, filed Feb. 10, 2017, 22 pages.
U.S. Pat. No. 10,561,884 Claim Chart, Case No. 3:22-cv-00492-JO-BLM, filed Apr. 11, 2022, 10 pages.
U.S. Pat. No. 10,799,745 Claim Chart, Case No. 3:22-cv-00492-JO-BLM, filed Apr. 11, 2022, 10 pages.
U.S. Pat. No. 11,465,005 Claim Chart, Case No. 3:22-cv-00492-JO-BLM, filed Oct. 24, 2022, 12 pages.
U.S. Pat. No. 9,039,580 Claim Chart, Case No. 3:22-cv-00492-JO-BLM, filed Apr. 11, 2022, 14 pages.
U.S. Notice of Allowance on U.S. Appl. No. 14/941,342 Dtd Dec. 21, 2017.
U.S. Notice of Allowance on U.S. Appl. No. 16/732,981 Dtd Feb. 28, 2022.
U.S. Office Action on 097208-0142 Dtd Jan. 27, 2014.
U.S. Office Action on U.S. Appl. No. 14/832,708 Dtd Jan. 2, 2018.
U.S. Office Action on U.S. Appl. No. 14/832,708 Dtd Nov. 17, 2016.
U.S. Office Action on U.S. Appl. No. 14/941,342 Dtd Mar. 23, 2017.
U.S. Office Action on U.S. Appl. No. 16/595,076 Dtd Mar. 11, 2021.
Video deposition transcript of James D. Whelan taken on Sep. 28, 2015, Case 2:13-cv-01276-KAM-AKT, Document 213-1, filed Aug. 8, 2018, 23 pps., marked on its face as Exhibit A.
Woodway USA, Inc.'s Answer to LifeCORE Fitness, Inc.'s Counterclaims to Woodway's First Amended and Supplemental Complaint, Case No. 3:22-cv-00492-JO-BLM, Filed Nov. 21 2022, 15 pages.
Woodway USA, Inc.'s Answer to LifeCORE Fitness, Inc.'s Counterclaims, Case No. 3:22-cv-00492-JO-BLM, Filed Jul. 5, 2022, 13 pages.
Woodway USA, Inc.'s First Amended and Supplemental Complaint, Case No. Case 3:22-cv-00492-JO-BLM, Filed Oct. 24, 2022, 10 pages.
Woodway USA, Inc.'s Opening Claim Construction Brief, Case No. 3:22-cv-00492-JO-BLM, Filed Mar. 1, 2023, 16 pages.
Woodway USA, Inc.'s Patent Owner's Preliminary Response, IPR2023-00836, dated Jul. 27, 2023, 57 pages.
Woodway USA, Inc.'s Patent Owner's Preliminary Response, IPR2023-00843, dated Jul. 27, 2023, 55 pages.
Woodway USA, Inc.'s Patent Owner's Preliminary Response, IPR2023-00849, dated Jul. 27, 2023, 52 pages.
Woodway USA, Inc.'s Responsive Claim Construction Brief, Case No. 3:22-cv-00492-JO-BLM, Filed Mar. 14, 2023, 28 pages.
Woodway USA, Inc.'s Table of Contents to Exhibits in Support of First Amended and Supplemental Complaint, Case No. 3:22-cv-00492-JO-BLM, Filed Oct. 24, 2022, 2 pages.
Woodway USA, Inc.'s Table of Contents to Exhibits in Support of Its Opening Claim Construction Brief, Case No. 3:22-cv-00492-JO-BLM, Filed Mar. 1, 2023, 226 pages.
Woodway USA, Inc.'s Table of Contents to Exhibits in Support of Its Responsive Claim Construction Brief, Case No. 3:22-cv-00492-JO-BLM, Filed Mar. 14, 2023, 19 pages.
Woodway USA, Inc., "Treadmill Owner's Manual", Oct. 2001, 56 pages.
Woodway USA, Inc., EcoMill Promotional Flyer, Oct. 18, 2011, 1 page.
Woodway USA, Inc., Owner's Manual: EcoMill Non-Motorized, Jun. 4, 2010, 35 pages.
Woodway USA, Inc.'s Amended Supplemental Counterclaims, Case 3:15-CV-01665-JCH, Document 309, filed Sep. 14, 2018, 28 pps.
Woodway USA, Inc.'s Answer, Affirmative Defenses, and Counterclaims to Plaintiffs' First Amended Complaint filed Oct. 24, 2014 and Exhibits 1 and 2.
Woodway USA, Inc.'s Answer, Affirmative Defenses, and Counterclaims to Plaintiffs' Second Amended Complaint filed Mar. 6, 2015, 17 pages.
Woodway USA, Inc.'s Answer, Affirmative Defenses, and Counterclaims to Plaintiffs' Supplemental Complaint filed Feb. 24, 2017, 18 pages.
Woodway USA, Inc.'s first supplemental responses and objections to plaintiff's first set of interrogatories (Nos. 1-7), Case 2:17-cv-00768-KAM-AKT, Document 38-1, filed Mar. 14, 2018, 18 pps., marked on its face as Exhibit A.
Woodway USA, Inc.'s List of Claim Terms to be Considered and Proposed Constructions, *Speedfit LLC and Aurel A. Astilean* v. *Woodway USA, Inc.*, Docket No. 2:17-cv-00768-KAM-AKT, Exhibit D, Mar. 26, 2018, 4 pages.
Woodway USA, Inc.'s local rule 56(a)1 statement of undisputed material facts in support of its motion summary judgment of infringement of U.S. Pat. No. 9,039,580, Case 3:15-CV-01665-JCH, Document 257, 8 pps.
Woodway USA, Inc.'s local rule 56(a)2 statement of facts in opposition to plaintiffs' motion for summary judgment, Case 3:15-CV-01665-JCH, Document 267, filed Jun. 29, 2018, 34 pps.
Woodway USA, Inc.'s Memorandum in response to Plaintiffs' Motion for Leave to Amend the Second Amended Complaint filed Jul. 7, 2015, 16 pages.
Woodway USA, Inc.'s Memorandum in Response to Plaintiffs' Motion Under 35 USC 256 to Correct Inventorship of U.S. Pat. No. 8,308,619 and U.S. Pat. No. 8,342,016 filed Jun. 15, 2015, 20 pages.
Woodway USA, Inc.'s memorandum in support of its motion to preclude the testimony of plaintiffs' technical expert James Whelan, Case 2:13-cv-01276-KAM-AKT, Document 212, filed Aug. 8, 2018, 37 pps.
Woodway USA, Inc.'s memorandum of law in opposition to plaintiffs' motion for summary judgment of non-infringement and invalidity of Claim 25 of U.S. Pat. No. 9,039,580, Case 3:15-CV-01665-JCH, Document 266, filed Jun. 29, 2018, 42 pps.
Woodway USA, Inc.'s Memorandum of Law in support of its motion for summary judgment of infringement of U.S. Pat. No. 9,039,580, Case 3:15-CV-01665-JCH, Document 256, 38 pps.
Woodway USA, Inc.'s Memorandum of Law in Support of Its Motions for Summary Judgment of Invalidity of U.S. Pat. Nos. 8,308,619 and 8,343,016 and Opening Claim Construction Brief filed Jun. 6, 2017, 38 pages.
Woodway USA, Inc.'s motion for summary judgment of infringement of U.S. Pat. No. 9,039,580, Case 3:15-CV-01665-JCH, Document 255, filed Jun. 8, 2018, 3 pps.
Woodway USA, Inc.'s Opening Claim Construction Brief, *Speedfit LLC and Aurel A. Astilean* v. *Woodway USA, Inc.*, Docket No. 2:17-cv-00768-KAM-AKT, Mar. 26, 2018, 15 pages.
Woodway USA, Inc.'s opposition to plaintiffs' motion for partial reconsideration, Case 3:15-CV-01665-JCH, Document 250, filed May 14, 2018, 19 pps.
Woodway USA, Inc.'s Patents, *Speedfit LLC and Aurel A. Astilean* v. *Woodway USA, Inc.*, Docket No. 2:17-cv-00768-KAM-AKT, Exhibit B, Mar. 26, 2018, 3 pages.
Woodway USA, Inc.'s Reply Claim Construction Brief, *Speedfit LLC and Aurel A. Astilean* v. *Woodway USA, Inc.*, Docket No. 2:17-cv-00768-KAM-AKT, Mar. 26, 2018, 9 pages.
Woodway USA, Inc.'s reply memorandum in further support of its motion to preclude the testimony of Plaintiffs' technical expert James Whelan, Case 2:13-cv-01276-KAM-AKT, Document 226, filed Aug. 8, 2018, 16 pps.
Woodway USA, Inc.'s Reply Memorandum in Support of Its Motion to Dismiss filed Nov. 25, 2015, 24 pages.
Woodway USA, Inc.'s Responsive Claim Construction Brief filed Jul. 28, 2017, 19 pages.
*Woodway* v. *Lifecore*, Defendants First Amended Invalidity Contentions and Claim Charts, Case No. 3:22-cv00492-JO-BLM, Dec. 9, 2022.
*Woodway* v. *Lifecore*, Defendants Invalidity Contentions, Case No. 3:22-cv-0492-JO-BLM, Dec. 9, 2022.
*Woodway* v. *Lifecore*, Responsive Claim Constructions and Identifications of Extrinsic Evidence of Defendant, Lifecore Fitness, Case No. 22-cv-492-JO-BLM, Jan. 5, 2023.
*Woodway* v. *Lifecore, Woodway USA, Inc.*'S Patent L.R.4.1(C) Responsive Claim Constructions and Identification of Extrinsic Evidence, Case No. 3:22-cv-0492-JO-BLM, Jan. 5, 2023.

(56) References Cited

OTHER PUBLICATIONS

Woodway's Opposition to Defendant's Notice of Motion and Motion to Dismiss Case and Transfer Litigation to EDNY, *Woodway USA, Inc*. v. *Aurel A. Astilean*, Civ. Dkt. No. 2:13-cv-00681-WERC (E.D. WI), Oct. 18, 2013, 22 pages.
Woodway, "Curve Trainer", Sep. 2, 2020, https://www.woodway.com/products/curve-trainer/, p. 1.
Woodway, "Introducing the all New EcoMill Self Powered", published to YouTube on Mar. 25, 2010, https://www.youtube.com/watch?v=NcPH92DAArc.
Woodway, "The Woodway LOKO Owners Manual", S55-70 E Standard Manual, Sep. 26, 2006, 47 pages.
Woodway, Curve 3.0 Specification, May 25, 2011, 1 page.
Woodway, Curve Specification, May 24, 2011, 1 page.
Woodway, Curve Specification, May 25, 2011, 1 page.
Woodway, Curve XL Specification, May 18, 2011, 1 page.
Woodway, Force Specification, Apr. 8, 2008, 1 page.
Woodway, Force Specification, May 2, 2011, 1 page.
Woodway, Force Specification, May 2, 2012, 1 page.
Woodway's USA, Inc.'s Reply in Support of its Motion for Summary Judgment of Invalidity of U.S. Pat. Nos. 8,308,619 and 8,343,016 and Reply Claim Construction Brief filed Jun. 6, 2017, 16 pages.
Woodways USA, Inc.'s Supplemental Rule 56.1 Statement of Undisputed Material Facts and Responses to Rule 56.1 Counterstatement by Plaintiffs Speedfit LLC and Aurel A. Astilean filed Jun. 6, 2017, 20 pages.
Interlocutory Decision in Opposition Proceedings for EP patent application 17738027.6, dated Dec. 12, 2023, 67 pages.

* cited by examiner

TREADMILL WITH INTERMEDIATE MEMBER

CROSS-REFERENCE TO RELATED PATENT APPLICATIONS

This application is a continuation of U.S. patent application Ser. No. 17/849,313, filed Jun. 24, 2022, which is a continuation of U.S. patent application Ser. No. 16/732,981, filed Jan. 2, 2020, which is a divisional of U.S. patent application Ser. No. 15/765,681, filed Apr. 3, 2018, which is a national stage of PCT/US2016/055572, filed Oct. 5, 2016, which claims the benefit of and priority to U.S. Provisional Patent Application No. 62/237,990, filed Oct. 6, 2015, all of which are incorporated herein by reference in their entireties. These applications are related to U.S. patent application Ser. No. 14/832,708, filed Aug. 21, 2015, which claims the benefit of priority as a continuation of U.S. patent applicant Ser. No. 14/076,912, filed Nov. 11, 2013, which is a continuation of U.S. patent application Ser. No. 13/235,065, filed Sep. 16, 2011, which is a continuation-in-part of prior international Application No. PCT/US2010/027543, filed Mar. 16, 2010, which claims priority to U.S. Provisional Application Ser. No. 61/161,027, filed Mar. 17, 2009, all of which are incorporated herein by reference in their entireties.

TECHNICAL FIELD

The present disclosure relates to treadmills. More particularly, the present disclosure relates to manually powered treadmills.

BACKGROUND

Treadmills enable a person to walk, jog, or run for a relatively long distance in a limited space. It should be noted that throughout this document, the term "run" and variations thereof (e.g., running, etc.) in any context is intended to include all substantially linear locomotion by a person. Examples of this linear locomotion include, but are not limited to, jogging, walking, skipping, scampering, sprinting, dashing, hopping, galloping, etc.

A person running generates force to propel themselves in a desired direction. To simplify this discussion and as used herein, the desired direction will be designated as the forward direction. As the person's feet contact the ground (or other surface), their muscles contract and extend to apply a force to the ground that is directed generally rearward (i.e., has a vector direction substantially opposite the direction they desire to move). Keeping with Newton's third law of motion, the ground resists this rearwardly directed force from the person, resulting in the person moving forward relative to the ground at a speed related to the force they are creating.

To counteract the force created by the treadmill user so that the user stays in a relatively static fore and aft position on the treadmill, most treadmills utilize a belt that is driven by a motor. The motor operatively applies a rotational force to the belt, causing that portion of the belt on which the user is standing to move generally rearward. This force must be sufficient to overcome all sources of friction, such as the friction between the belt and other treadmill components in contact therewith and kinetic friction, to ultimately rotate the belt at a desired speed. The desired net effect is that, when the user is positioned on a running surface of the belt, the forwardly directed force achieved by the user is substantially negated or balanced by the rearwardly directed rotation of the belt. Stated differently, the belt moves at substantially the same speed as the user, but in the opposite direction, the forward force generated by the user is balanced by the rotational force of the belt. In this way, the user remains at substantially the same relative position along the treadmill while running. It should be noted that the belts of conventional, motor-driven treadmills must overcome multiple, significant sources of friction because of the presence of the motor and configurations of the treadmills themselves.

Similar to a treadmill powered by a motor, a manual treadmill or manual powered treadmill must also incorporate some system or means to absorb or counteract the forward force generated by a user so that the user may generally maintain a substantially static position on the running surface of the treadmill. The counteracting force driving the belt of a manual treadmill is desirably sufficient to move the belt at substantially the same speed as the user so that the user stays in roughly the same static position on the running surface. Unlike motor-driven treadmills, however, this force is not generated by a motor.

SUMMARY

One embodiment relates to a manual powered treadmill. The manual powered treadmill includes a frame; a front shaft coupled to the frame; a rear shaft coupled to the frame; and a running belt disposed about the front and rear shafts, wherein the running belt assumes at least a portion of a curved running surface. According to one configuration, wherein the running belt includes: a first endless belt and a plurality of slats, each slat having a first side and a second side and coupled to the first endless belt, wherein each slat in the plurality of slats includes a user engagement surface provided on the first side of the slat and a rib positioned on the second side of the slat, wherein the rib extends away from the user engagement surface.

Another embodiment relates to a treadmill. The treadmill includes a frame having a front end and a rear end, the front end disposed substantially longitudinally opposite the rear end; a front shaft coupled to the frame by a first bearing assembly, the first bearing assembly pivotably coupled to the frame near the front end; a rear shaft coupled to the frame near the rear end; a running belt disposed about the front and rear shafts, wherein the running belt defines at least a portion of a curved running surface; and a first tension assembly configured to adjust a position of the front shaft relative to the rear shaft to adjust a tension of the running belt. According to one configuration, the first tension assembly includes: a rod movable closer to and further from the first bearing assembly, wherein movement of the rod relative to the first bearing assembly results in rotational movement of the first bearing assembly along a curve shape towards the front end of the frame to alter a tension applied to the running belt.

Still another embodiment relates to a manual powered treadmill. The manual powered treadmill includes a frame; a front shaft assembly coupled to the frame; a rear shaft assembly coupled to the frame; an intermediate shaft coupled to the frame, wherein the intermediate shaft is disposed intermediate the front shaft assembly and the rear shaft assembly; a running belt disposed about the front and rear shaft assemblies, wherein the running belt defines at least a portion of a non-planar running surface; and, a safety device coupled to the intermediate shaft, the safety device operable to substantially prevent movement of the running belt in a first direction and to permit movement of the running belt in a second direction opposite the first direction.

Yet another embodiment relates to a manual powered treadmill. The manual powered treadmill includes a frame; a front shaft coupled to the frame; a rear shaft coupled to the frame; and a running belt disposed about the front and rear shafts, wherein the running belt assumes at least a portion of a curved running surface, the curved running surface having a radius of curvature of approximately 88 to 138 inches.

DETAILED DESCRIPTION

Referring to the Figures generally, a manual treadmill is shown according to various embodiments herein. According to the present disclosure, the manual treadmill may include a running belt that defines a substantially non-planar running surface (e.g., an arced or curved running surface). Among other benefits, the non-planar running surface may facilitate a user to experience a relatively faster acceleration characteristic than other treadmills having non-planar running surfaces (e.g., an ability to reach greater speeds faster). That being said, according to the present disclosure, the Applicant has structured the non-planar running surface to not only achieve a relatively faster acceleration rate or responsiveness to the force generated by the user compared to other treadmills, but to also facilitate use-ability in the form of stopping and dismounting at will without the use of a braking system. Additionally, Applicant has also innovated a radius of curvature for the non-planar running surface that may maintain the curve profile of the running belt surface without the need of other belt retention systems.

Applicant has also developed an innovative motion restriction system that prevents or substantially prevents movement of the running belt in one rotational direction. According to the present disclosure, when a user steps onto the curved running surface, the running belt will resist moving or rolling forward (i.e., towards a front end of the treadmill, which is opposite to the rotational direction of the running belt when in use) to provide stability to the user as the user gets comfortable to begin using the treadmill (e.g., walking, running, skipping, etc.). These and other features benefits of the manual treadmill of the present disclosure are described more fully herein below.

Figure 1:
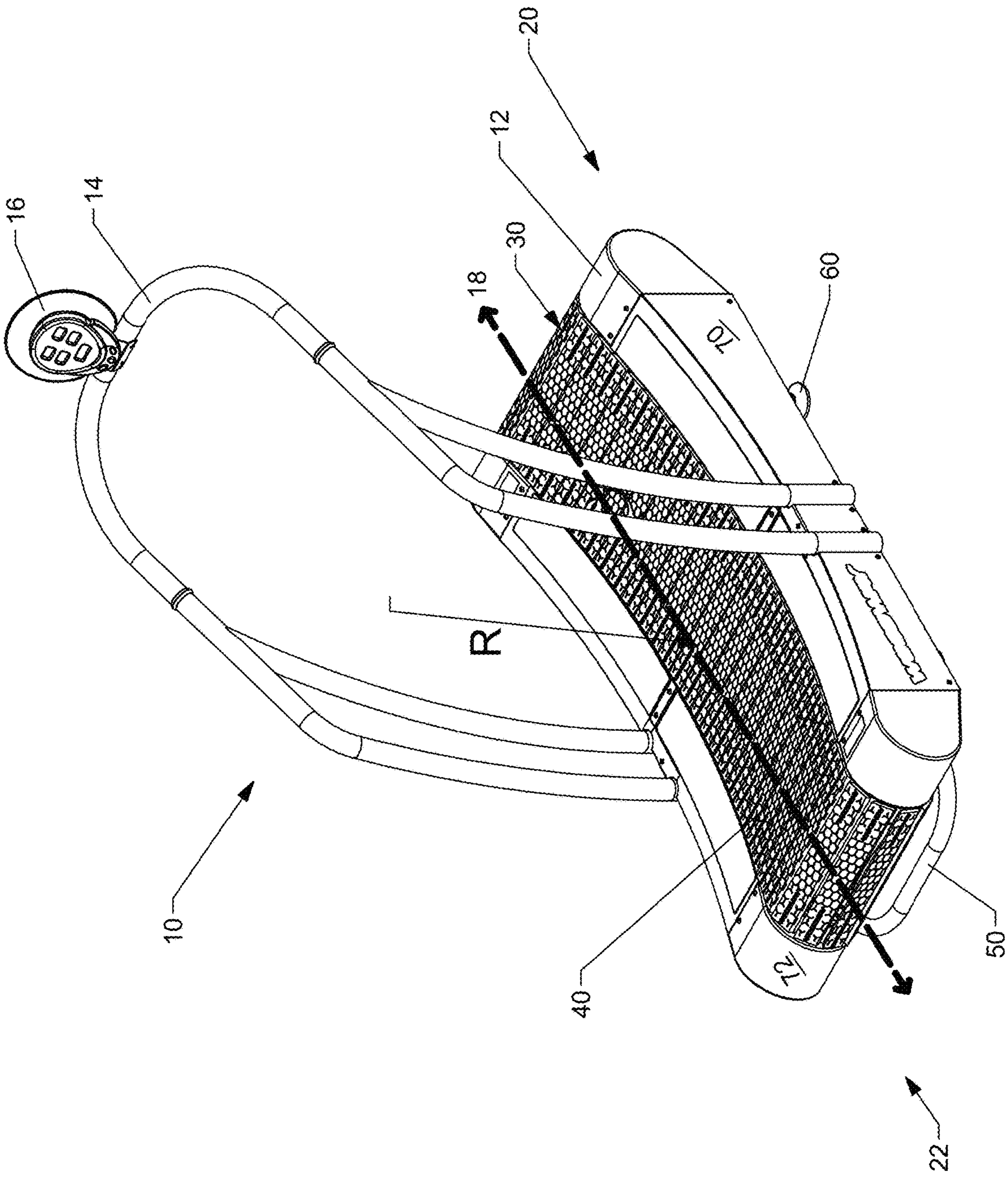
FIG. 1 is a perspective view of a manual treadmill having a non-planar running surface, according to an exemplary embodiment.

Referring now to FIG. 1, a manual treadmill 10 is shown according to one embodiment. The treadmill 10 generally includes a base 12 and a handrail 14 mounted to the base 12. The base 12 generally refers to the assembly of components located proximate to a support surface (e.g. the floor or ground) for the manual treadmill 10 (i.e., excluding the handrail 14). Accordingly, the base 12 is shown to include a running belt 30 that extends substantially longitudinally along a longitudinal axis 18, a handle 50 positioned on one end for use when transporting the unit, support feet 60, wheels 62 opposite the handle, and various other components described herein. The longitudinal axis 18 extends generally between a front end 20 and a rear end 22 of the treadmill 10; more specifically, the longitudinal axis 18 extends generally between the centerlines of a front shaft and a rear shaft, which will be discussed in more detail below. It should be noted that the left and right-hand sides of the treadmill and various components thereof are defined from the perspective of a forward-facing user standing on the running surface of the treadmill 10.

Figure 2:
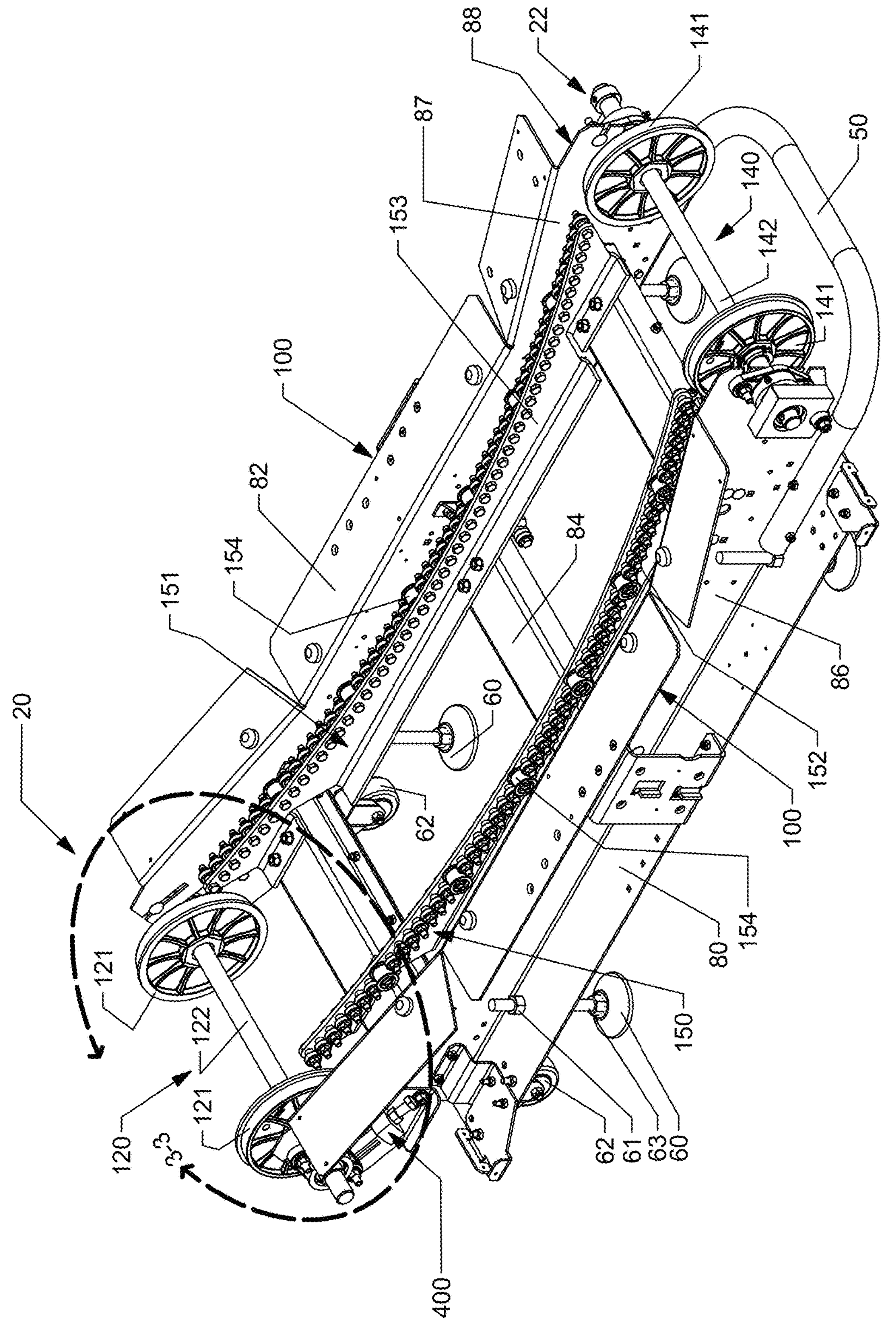
FIG. 2 is a perspective view of the base of the treadmill of FIG. 1 with most of the coverings removed, according to an exemplary embodiment.

The manual treadmill 10 includes a pair of side panels 70 and 72 (e.g., covers, shrouds, etc.) that are provided on the left and right side of the base 12. The side panels 70 and 72 may shield the user from the components or moving parts of the treadmill 10. As seen in FIGS. 1 and 2, the treadmill comprises a frame 100 which is adapted to support the side panels 70 and 72 among, at least in part, various other components of the manual treadmill 10. The side panels 70 and 72 are preferably coupled to the frame 100 and, in particular, to the left and right side frame members 80 and 82 (described further below) of the frame 100. The base 12 may be supported, at least in part, by multiple support feet 60, which will be described in greater detail below. A rearwardly extending handle 50 is coupled to the frame 100 and provided at or near the rear end of the base 12 and a pair of wheels 32 are similarly coupled to the frame 100 and provided at or near the front of the base 12. In use, the wheels 62 are mounted so that they are generally not in contact with the ground (or support surface for the treadmill 10) when the treadmill is in an operating position (i.e., when a user may run, walk, skip, or otherwise use the treadmill 10). The handle 50 is shown to be curve-shaped to provide ergonomic, aesthetic, and functionality to the treadmill 10. In operation, the user can move and relocate the treadmill 10 by grasping the handle 50 and lifting the rear of the treadmill base 12 so that the multiple support feet 60 are no longer in contact with the surface. As the rear of the treadmill base 12 continues to be lifted, the wheels 62 will eventually contact the ground/support surface to thereby permit the user to easily roll the entire treadmill 10.

As seen in FIG. 2, the base 12 includes the frame 100, which in this embodiment represents an assembly of elements coupled together that form or make-up the frame 100. However, in an alternate embodiment, the frame 100 may be an integral, single, unitary, or one-piece component or element. The base 12 is also shown to include a front shaft assembly 120 coupled to the frame 100 and positioned near a front end 20, and a rear shaft assembly 140 coupled to the frame 100 and positioned near the rear end 22 of frame 100, generally opposite the front end 20. In operation, the frame 100 may support, at least partially, the front and rear shaft assemblies 120 and 140.

In the example depicted herein, the components that are assembled to form the frame 100 are shown to generally include a left side frame member 80, a right side frame member 82, and one or more lateral or cross-members 84 extending between and coupled to each of the left and right side frame members 80 and 82. More particularly, the frame 100 includes longitudinally-extending, opposing side frame members, shown as the left side frame member and the right side frame member 82, and one or more lateral or cross-members 84 extending between and structurally coupling the side frame members 80 and 82. As shown, the left side frame member 80 includes an inner surface 85 and an outer surface 86, while the right side frame member 82 includes an inner surface 87 and an outer surface 88 (see FIG. 3 as well). When the frame 100 is assembled, the inner surfaces 85 and 87 of the opposing side frame members face each other. The surfaces 85-88 have been called out for clarity to aid the description of various components introduced herein (e.g., to help describe the relative position of one or more components). It should be understood that the depiction of the frame 100 configuration herein is exemplary only. According to other embodiments, the frame may have substantially any configuration suitable for providing structure for the manual treadmill.

The front shaft assembly 120 includes a pair of front running belt pulleys 121 coupled to, and preferably directly mounted to, a shaft 122, while the rear shaft assembly 140 includes a pair of rear running belt pulleys 141 coupled to, and preferably directly mounted to, a shaft 142. The front and rear running belt pulleys 121, 141 are configured to facilitate movement/rotation of the running belt 30. In this regard and as discussed in more detail below, the running belt 30 is disposed about the front and rear running belt pulleys 121, 141. As the front and rear running belt pulleys 121, 141 are preferably fixed relative to shafts 122 and 142, respectively, rotation of the front and rear running belt pulleys 121, 141 causes the shafts 122, 142 to rotate in the same direction. The front and rear running belt pulleys 121, 141 may be formed of any material sufficiently rigid and durable to maintain shape under load. According to one embodiment, the material is relatively lightweight so as to reduce the inertia of the pulleys 121, 141. The pulleys 121, 141 may be formed of any material having one or more of these characteristics (e.g., metal, ceramic, composite, plastic, etc.). According to the exemplary embodiment shown, the front and rear running belt pulleys 121, 141 are formed of a composite-based material, such as a glass-filled nylon, for example, Grivory® GV-5H Black 9915 Nylon Copolymer available from EMS-GRIVORY of Sumter, SC 29151, which may save cost and reduce the weight of the pulleys 121, 141 relative to metal pulleys. To prevent a static charge due to operation of the treadmill 10 from building on a pulley 121, 141 formed of electrically insulative materials (e.g., plastic, composite, etc.), an antistatic additive, for example Antistat 10124 from Nexus Resin Group of Mystic, CT 06355, maybe may be blended with the GV-5H material.

As shown in FIG. 1, the running belt 30 defines a non-planar running surface 40. To maintain the non-planar running surface 40, a pair of laterally opposed support structures or bearing rails 150 and 151 are coupled to the frame 100 and are adapted to support, at least in part, the running belt 30. The bearing rails 150 and 151 define, at least in part and in some instances, substantially all of the curved or non-planar surface 40 and facilitate ensuring that the running surface maintains the desired curved surface 40. In the example shown, the left side bearing rail 150 and right side bearing rail 151 are coupled to and supported by the one or more cross-members 84. Further, the bearing rails 150 and 151 are mounted between or substantially between the front shaft assembly 120 and the rear shaft assembly 140. In this regard, the left side bearing rail 150 is coupled to one or more cross-members 84 proximate the left side frame member 80, while the right side bearing rail 151 is coupled to the one or more cross-members 84 proximate the right side frame member 82. Thus, and as shown, the one or more cross-members 84 are coupled to each of the bearing rails 150, 151 and to each of the left and right side frame members 80 and 82. However, in other embodiments, the bearing rails 150, 151 may be coupled directly to the left and right side frame members 80 and 82, respectively. In this regard, use of the cross-members 84 to couple the bearing rails 150 and 151 to the left and right side frame members 80, 82 is exemplary only and not meant to be limiting.

As shown in FIG. 2, the bearing rail 150 may include a left side bearing rail frame 152 (e.g., support structure, etc.) while the bearing rail 151 may include a right side bearing rail 153. Each of the bearing rail frames 152 and 153 may couple to and support a plurality of bearings 154, respectively. As mentioned above, the left bearing rail frame 153 may be coupled to and therefore proximate to a left side of the frame 100 while the right bearing rail frame 152 may be coupled to and therefore proximate to a right side of the frame 100. Before turning to various other components of the treadmill 10, the structure and function of the bearing rails 150 and 151 are firstly described.

Figure 16:
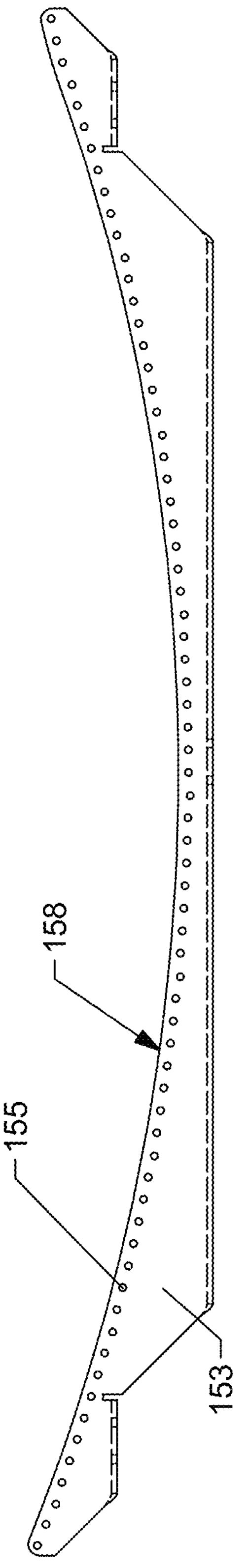
FIG. 16 is a side view of a bearing rail frame for the treadmill of FIG. 1, according to an exemplary embodiment.
Figure 17:
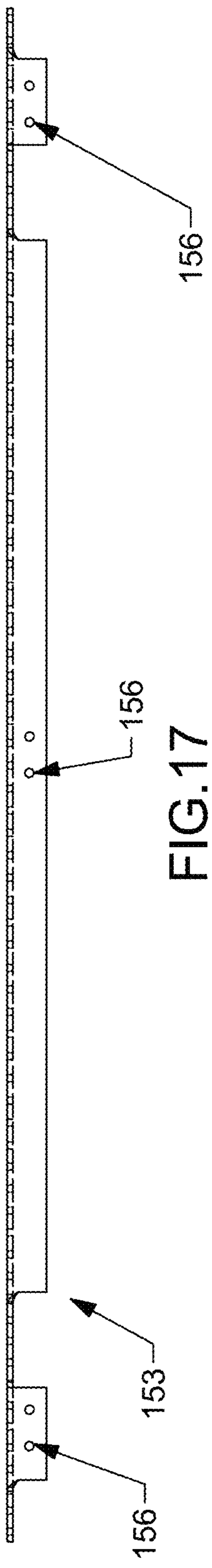
FIG. 17 is a top view of the bearing rail frame of FIG. 16, according to an exemplary embodiment.
Figure 18:
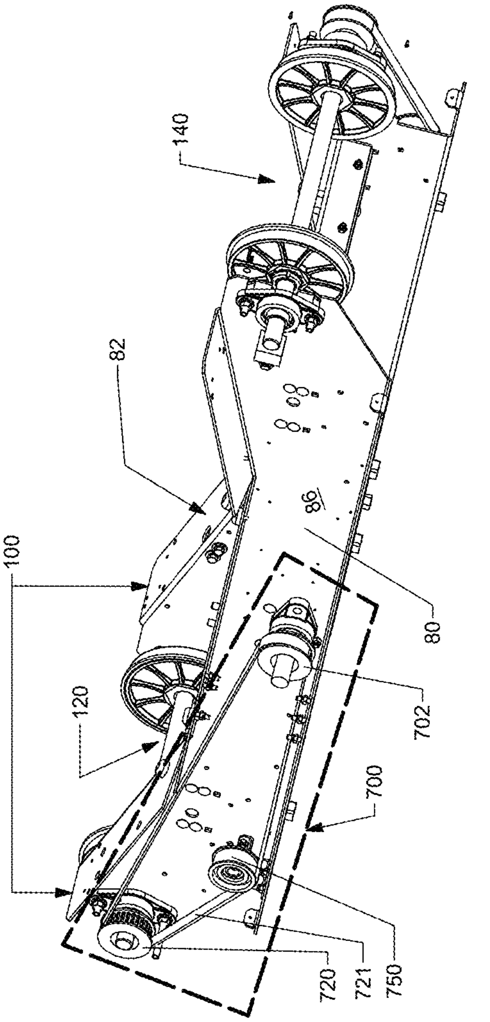
FIG. 18 is a left side perspective view of a treadmill frame with a motion restriction system, according to an exemplary embodiment.
Figure 19:
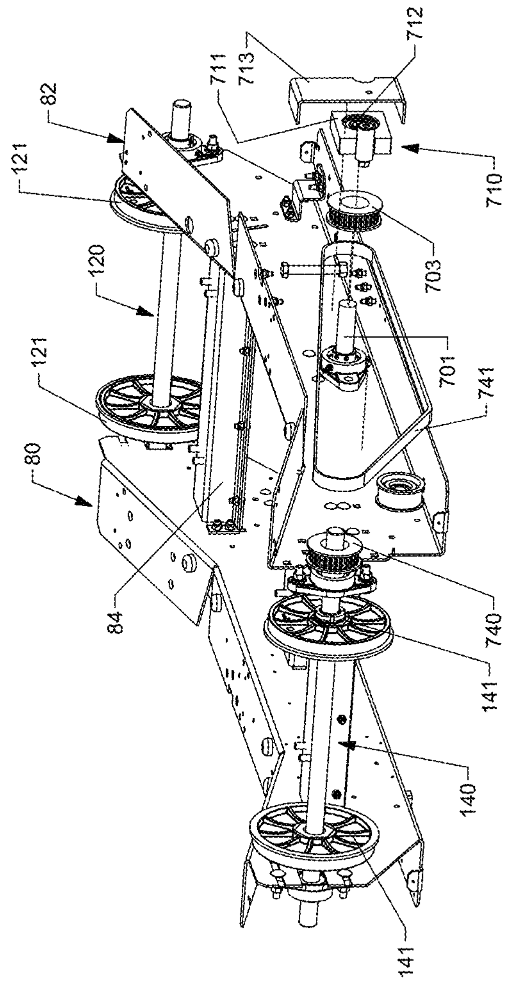
FIG. 19 is a right side perspective of FIG. 18, according to an exemplary embodiment.

Accordingly, referring now to FIGS. 16-17, the right bearing rail frame 153 for the treadmill 10 is shown according to example side (FIG. 16) and top (FIG. 17) views. It should be understood that the left side bearing rail frame 152 may be the same or substantially the same as the right side frame 153, just a mirror image of the right side frame 153. Accordingly and while the bearing rail frame 153 is only shown and described in FIGS. 16-17, the same or similar configuration/description may be applicable with the left side bearing rail frame 152. It should also be understood that in this embodiment, the bearing rail frames 152 and 153 are of unitary construction (e.g., one-piece components). However and in accord with the definition for “frame” provided herein, in other embodiments, the bearing rail frames 152 and 153 may be constructed or formed from two or more components coupled together. All such variations are intended to fall within the scope of the present disclosure. In either configuration, the bearing rail frames 152, 153 may be constructed from any suitable material (e.g., sheet metal, aluminum, composites, etc.). Thus, those of ordinary skill in the art will appreciate the high configurability of the bearing rail frames 152 and 153.

As shown, the bearing rail frame 153 defines a plurality of holes 156 and apertures 155. The holes 156 are disposed on flanges extending away from the surface where the apertures 155 are disposed. In the example shown, the holes 156 and apertures 155 are positioned or disposed in planes that are substantially perpendicular to each other. Of course, in other embodiments, a different planar angle of separation or no planar angle of separation (i.e., where the holes 156 and apertures 155 are disposed in or substantially in the same plane) may be implemented. The holes 156 (e.g., apertures, voids, etc.) may receive a fastener (e.g., screw, nail, etc.) in order to facilitate coupling the bearing rail frame to the cross-members 84. The apertures 155 (e.g., openings, voids, etc.) may be sized and structured to may a bearing 154 so that the bearing 154 is coupled or mounted to the bearing rail frame 153.

Due to the shape of the frame 153 (and frame 152), a top profile 158 having a particular, desired contour may be formed/defined. As described herein below, the top profile 158 may at least partially define the non-planar running surface 40. While only the top profile 158 is shown with respect to the bearing rail frame 153, a matching or substantially matching profile may be implemented with the bearing rail frame 152. As a result, these two profiles may at least partially define the non-planar running surface 40.

As described herein, the bearings 154 coupled to the bearing rails 150 and 151 may facilitate movement of the running belt 30. When the running belt 30 moves substantially along the top profile 158 of the bearing rails 150 and 151, the running belt 30 contacts and is supported, at least in part, by the bearings 154 of the bearing rails 150 and 151. The bearings 154 are configured to rotate to thereby decrease the friction experienced by the running belt 30 as the belt moves along and follows the top profile 158.

As alluded to above, the bearing rails 150 and 151 are configured to help substantially achieve the desired shape or contour of the running surface 40. In this regard, the shape of the top profile 158 of the bearing rails 150 and 151 at least partially corresponds to the desired shape for the running surface 40. The running belt 30 has a sufficient level of flexibility/elasticity so that the running belt 30 substantially follows and assumes the shape of top profile 158 as the running belt passes over the top profile. Accordingly, the running surface 40 has a shape that substantially corresponds to the shape of the top profile 158. It should be noted that the front and/or rear running belt pulleys may also help define a portion of the shape of the running surface. In this regard, the bearings and the corresponding bearing rails 150 and 151 may only define/correspond with part of the running surface 40. Also, other suitable shape-providing components may be used in combination with the bearing rails.

As mentioned above, a plurality of bearings 154 may be coupled to each of the bearing rail frames 152 and 153. According to one embodiment, the bearings 154 are structured as any type of bearing that rotates to help decrease friction between the running belt 30 and the bearings 154 themselves so that the belt may achieve a relatively fast acceleration in comparison to currently available treadmill belts. In this regard and in one embodiment, the bearings 154 are structured as low-resistance bearings that are characterized by having a relatively low viscosity bearing fluid. The low viscosity bearing fluid facilitates an even greater reduction in friction in order to further aid in the ability to quickly accelerate the running belt 30. The embodiment depicted shows the plurality of bearings 154 mounted to and supported by the bearing rail frames 152 and 153. However, a person skilled in the art will appreciate that the bearing rail frames can be eliminated and the bearings 154 can be mounted directly to the left and right side frame members 80 and 82.

Figure 3:
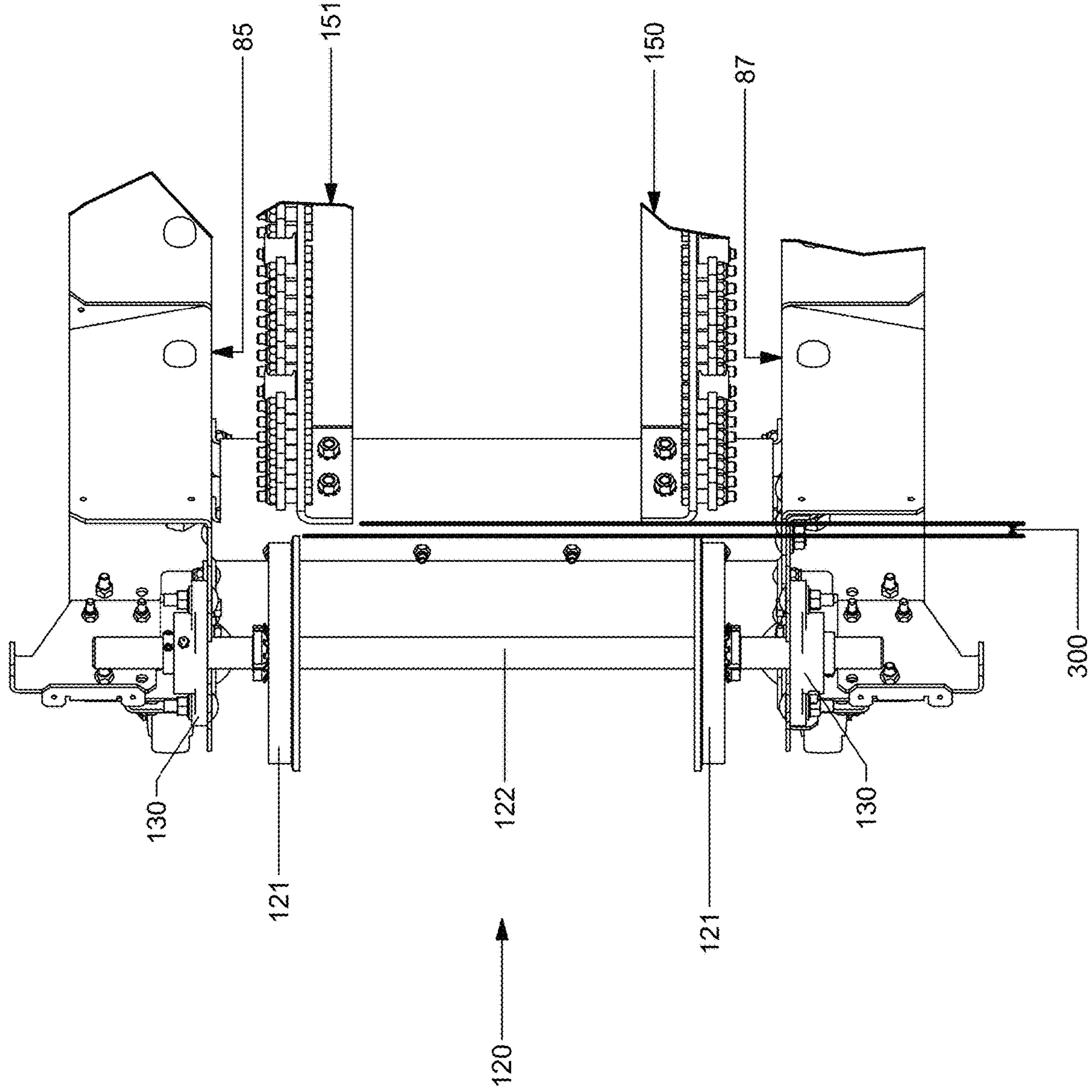
FIG. 3 is a close-up overhead partial view of the front shaft assembly of the treadmill of FIG. 1, according to an exemplary embodiment.

Referring now to FIG. 3 in combination with FIG. 2, a close-up view of the front shaft assembly 120 is shown according to an exemplary embodiment. According to one embodiment, the front and rear running belt pulleys 121 and 141 are tangential with the profile 158. In this regard, the front and rear pulleys 121 and 141 provide support for the non-planar curve with a radius of curvature, R. According to another embodiment and the example shown, at least one of the front and rear running belt pulleys 121, 141 are positioned non-tangential relative to the profile 158. In the example depicted, each of the front and rear running belt pulleys 121, 141 are positioned slightly non-tangential to the profile 158. In particular, the rear shaft assembly 140 is positioned relatively closer to the ground/support surface for the treadmill 10 than the front shaft assembly 120 (i.e., relative to a horizontal plane corresponding to a support surface for the treadmill 10, the rear shaft assembly 140 is positioned relatively closer to the horizontal plane than the front shaft assembly 120). Accordingly, the rear shaft assembly 140 is positioned slightly below the adjacent terminal edge of the profile 158. In comparison, the front shaft assembly 120 is positioned slightly above the adjacent terminal edge of the profile 158 of the bearing rails 150 and 151. Applicant has determined that the slight non-tangential relationship between the bearing rails 150 and 151 and the front and rear shaft assemblies 120, 140 facilitates maintenance of the curved running surface 40 and helps achieve the relatively faster acceleration characteristic described herein.

As shown in FIG. 3, a gap 300 is defined by an end of the bearing rails 150 and 151 and the front running belt pulleys 121. In comparison, because the rear shaft assembly 140 is positioned slightly below the bearing rails 150 and 151, a relatively smaller gap is defined between the terminal, adjacent end of the bearing rails 150 and the rear shaft assembly 140. More particularly, by positioning the rear pulleys 141 adjacent to and slightly below the bearing rails 150 and 151 (i.e., proximate the support surface), a relatively smaller gap between the rear pulleys 141 and the bearing rails 150 and 151 may be created because the rear running belt pulleys 141 may be slightly tucked underneath the terminal ends of the bearing rails 150 and 151. Accordingly, in one embodiment, the rear pulleys 141 and the terminal end of the bearing rails 150 proximate the rear pulleys 141 are in an overlapping relationship, with the rear pulleys 141 positioned below the bearing rails 150 and 151. The overlapping relationship provides substantially continuous engagement with the running belt 30 support structure (e.g., from the bearing rails 150 and 151 to the rear running belt pulleys 141). Beneficially, such a continuous relationship alleviates or substantially alleviates any form of looseness in the running belt 30 near the rear end 22. The alleviation of the looseness may provide a better running experience for the user. According to another embodiment, the gap 300 may be replaced with an overlapping relationship such as that employed with the rear shaft assembly 140 and the end of the bearing rails 150 and 151 proximate the rear end 22.

Figure 4:
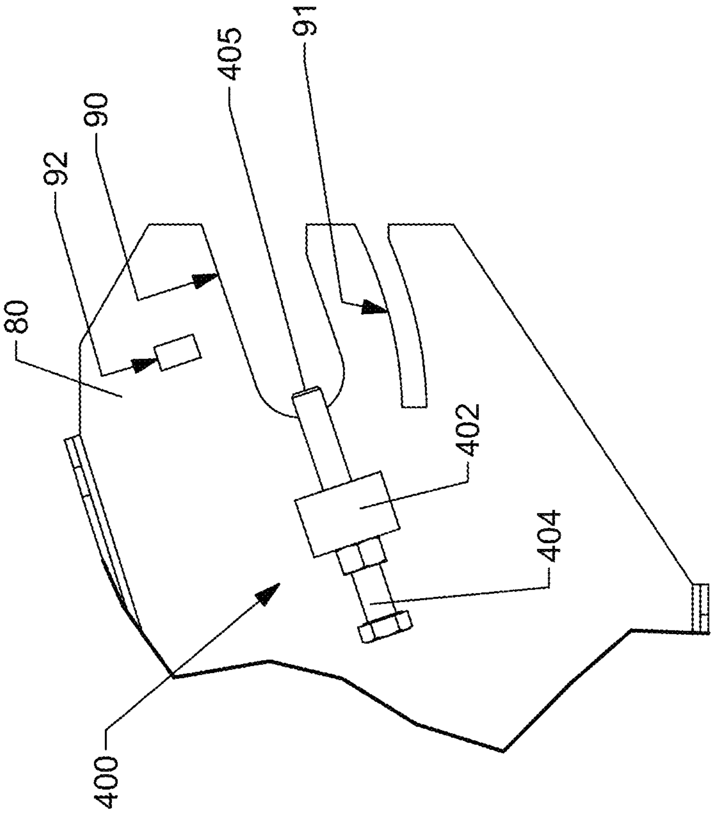
FIG. 4 is a close-up side view of a tension assembly for the treadmill of FIG. 1, according to an exemplary embodiment.
Figure 5:
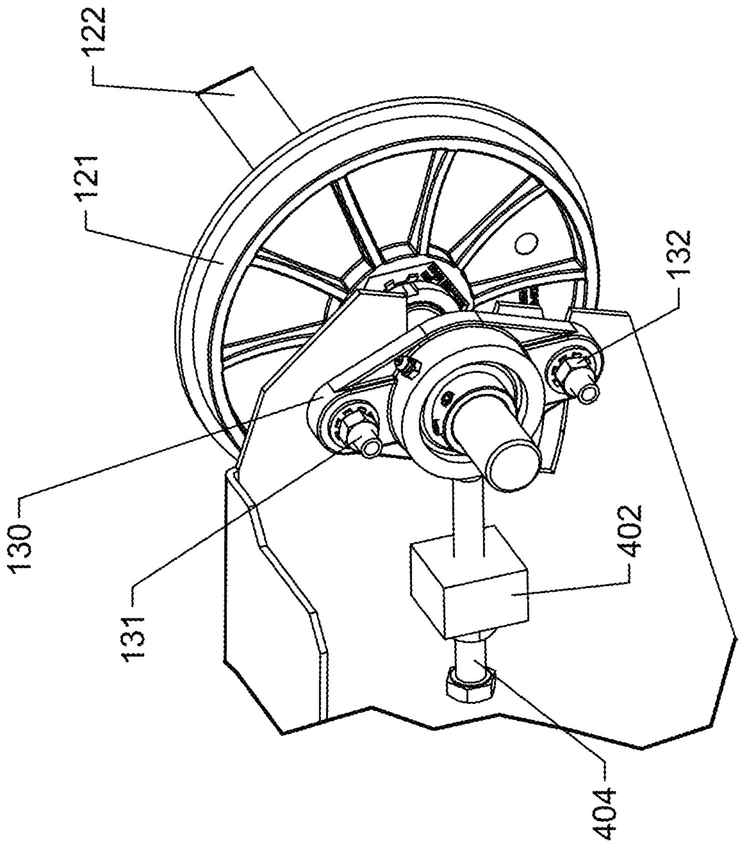
FIG. 5 is a close-up perspective view of the front shaft assembly and the tension assembly of the treadmill of FIG. 1, according to an exemplary embodiment.

Referring now to FIGS. 4-5, a tension assembly 400 for the treadmill 10 is shown according to one embodiment. The tension assembly 400 may be structured to selectively adjust a position of the front shaft assembly 120 relative to the frame 100 to add, reduce, and generally control a tension applied to the running belt 30. In the example shown, a tension assembly 400 is attached to each of the side frame members 80, 82 near a front end 20 of the treadmill 10 in order to selectively engage with the front shaft assembly 120. According to another embodiment, tension assemblies, like the tension assembly 400, may additionally (or only) be attached to the frame 100 near the rear end 22 of the treadmill 10 to control an amount of tension applied to the running belt 30 via the rear shaft assembly 140. In this regard, tension assemblies may be used to control a tension applied to the running belt 30 through at least one of the front and rear shaft assemblies 120, 140.

As shown, the tension assembly 400 includes a block 402 coupled or fixedly attached to the frame 100 and a rod 404 movably coupled with the block 402. According to one embodiment, the rod 404 is threadedly engaged with the block 402, such that a user may rotate the rod 404 to move the end of the rod 404 closer to or further from a bearing assembly 130. According to another embodiment, the rod 404 may be movably coupled with the block 402 in any manner that permits the rod 404 to move fore and aft relative to the bearing assembly 130.

As shown, the bearing assembly 130 supports an end of the shaft 122 of the front shaft assembly 120. According to the example shown, the bearing assembly 130 is pivotably coupled to the frame 100: one bearing assembly 130 is pivotably coupled to the left side frame member 80 and another bearing assembly 130 is pivotably coupled to the right side frame member 82. At or near an end of the left side frame member 80 (and the right side frame member 82, which is not shown), a plurality of apertures are provided therein. The apertures may include an opening 90 for receiving the shaft 122, a slot 91 (e.g., void, aperture, etc.), and a mounting hole 92. As shown, the mounting hole 92 is positioned above the opening 90, while the slot 91 is positioned adjacent to and below the mounting hole 92. The mounting hole 92 is structured to receive a top fastener 131 of the bearing assembly 130. The top fastener (e.g., bolt, screw, etc.) fixedly couples the bearing assembly 130 to the left side frame member 80 of the frame 100. The slot 91 may be structured to receive a bottom fastener 132 of the bearing assembly 130. The bottom fastener 132 (e.g., bolt, screw, etc.) is sized and shaped to facilitate sliding movement of the bearing assembly along the length of the slot 91.

With the above structure in mind, an example operation of the tension assembly 400 may be described as follows. To dispose the running belt 30 about the front and rear pulleys 121, 141, a user may apply a force to each rod 404 to reduce the force applied by a tip 405 of the rod to each bearing assembly 130. As a result, each bearing assembly 130 may rotate about the top fastener 131 towards the rear end 22 of the treadmill (i.e., towards the rear shaft assembly 140). The relatively closer positioning of the front and rear shaft assemblies 120, 140 facilitates relatively easier installation of the running belt 30 about the pulleys 121, 141. After the running belt 30 is disposed about the front and rear pulleys 121, 141, the user may engage the rod 404 to apply a force from the tip 405 to the bearing assembly 130 to push the bearing assembly 130 closer towards the front end 20 of the treadmill (i.e., away from the rear end 22). In operation, moving the bearing assembly 130 towards the front end 20 moves the front pulleys 121 towards the front end 20, which in turn increases the tension applied by the front shaft assembly 120 to the running belt 30. A locking mechanism (e.g., cooperating threaded shaft and nut, locking pin, etc.) may be used to hold or retain the rod 404 in a desired engagement location with the bearing assembly 130. To replace or remove the running belt 30, the user may loosen each tension assembly to move the bearing assemblies 130 (and, in turn, shaft 122) closer to the rear end 22.

Figure 20:
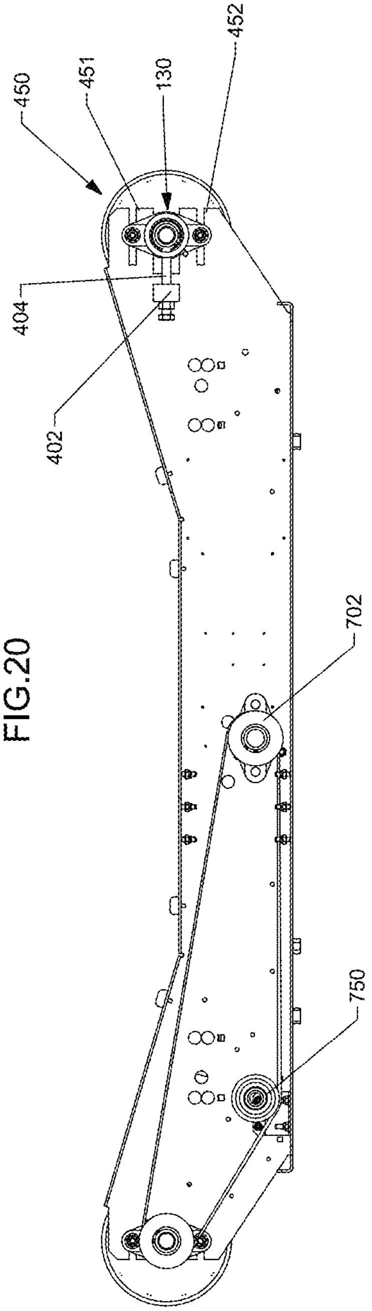
FIG. 20 is a left side view of FIG. 18, according to an exemplary embodiment.

According to one embodiment, the slot 91 is arcuate shaped. Accordingly, the bottom fastener 132 may move along an arc or curve, which implicates a pivot motion about the top fastener 131 to increase/decrease tension applied to the running belt 30. In this regard, the length, orientation and relative curvature of the slot 91 facilitates added control to selectively adjust the tension applied by the tension assembly 400. In another embodiment, the slot 91 may be any shape and size (e.g., length and width) to permit any type of movement of the bearing assembly 130 (e.g., linear versus the arcuate or pivot motion shown). For example, in other embodiments, the top fastener 131 may be engaged with an upper slot while the bottom fastener 132 is fixedly coupled to the frame. In this embodiment, the bearing assembly rotates about the bottom fastener 132. In another embodiment, tension assemblies may be applied with only the rear shaft assembly 140 and/or with both the front and rear shaft assemblies 120, 140. In still another embodiment, the bearing assembly 130 may move as a unit to control the tension applied to the running belt 30 (i.e., rather than rotating about a fixed point—e.g., fastener 131—like shown in FIG. 5; see, e.g., FIG. 20). For example, each of the top and bottom fasteners 131, 132 may be engaged with slots (preferably arced slots) defined by the side member of the frame. The slots may terminate at or near the end of the side frame members. Accordingly, the movement of the bearing assemblies may be constrained by the termination points of the slots. In yet another embodiment, the treadmill 10 may include any combination of the aforementioned tension assemblies. All such variations are intended to fall within the spirit and scope of the present disclosure.

According to the innovations describe herein, several mechanisms are utilized by the treadmill 10 to facilitate a quick or relatively quick acceleration characteristic of the running belt 30 yet still provide adequate control to the user of the treadmill 10 (e.g., to stop or dismount the treadmill). Beneficially, a user may reach relatively greater speeds in a shorter period of time due to these mechanisms. This feature becomes important when accommodating and developing quick acceleration by the user is important, for example with professional athletes using the treadmill as a training tool.

One such innovation is a height adjustment system for the treadmill 10 that may adjust at least one of the front end 20 and the rear 22 of the treadmill 10 relative to a support surface (e.g., ground). In the example depicted, the height adjustment system includes the support feet 60 interconnect with a rod 63 extending towards the frame 100 from the support surface. A locking device 61 (e.g., a nut) may adjustably control the extension amount of the rod 63 from the frame. Raising the front end 20 of the treadmill 10 increases an incline of the treadmill 10 to increase an acceleration ability of the user on the treadmill 10. If a user desires a relatively lower acceleration ability, the user may adjust the incline or height of the treadmill closer to parallel (e.g., where the frame 100 is parallel with a horizontal support surface). It should be understood that while the present disclosure depicts a manual height adjustment system, other systems may utilize a motorized height adjustment system for the treadmill. All such variations are intended to fall within the scope of the present disclosure.

Another such innovation includes the use of low-resistance bearings used with the bearing assembly 130 that couple to and support, at least in part, the front and rear shafts 122, 142. The low-resistance bearings included with the bearing assembly 130 may utilize a relatively lower viscosity bearing fluid/lubricant, which reduces the friction between the races of the bearing to enable the shafts 122, 142 to rotate easier by overcoming relatively less friction exerted by the bearings on the shafts. In operation, as a user runs or otherwise utilizes the treadmill 10, the running belt 30 rotates. The rotation of the running belt 30 is transferred to the front and rear pulleys 121, 141, which causes rotation of the front and rear shafts 122, 142. By reducing the resistance applied to the shafts 121, 141 via the bearings in the bearing assemblies 130, the shafts 121, 141 may rotate relatively more freely to ensure or substantially ensure the force applied by the user is un-inhibited from the force translation system of the treadmill 10.

According to one embodiment, the low-resistance bearings utilize low viscosity grease as the low-resistance bearing fluid/lubricant. According to the present disclosure, the low viscosity grease has a National Lubricating Grease Institute (NLGI) classification of between 000 and 1 and, preferably, a classification of 00. While the fill amount is highly configurable (of the low viscosity grease in the bearing of the bearing assembly 130), in the example depicted, a thirty to fifty percent fill is used. However, as those of ordinary skill in the art will recognize, the fill amount is highly configurable, such that the aforementioned amount is illustrative only and not meant to be limiting.

According to an alternate embodiment, the low-resistance bearings utilize low viscosity oil as the low-resistance bearing fluid/lubricant. In this regard, Applicants have determined that the low viscosity grease provides better serviceability with comparable performance to the low viscosity grease. While many different low viscosity oils are possible, an example of a low viscosity oil is Mobil Velocite™ No. 10. However, this call out is not meant to be limiting as many different types of low viscosity oil are contemplated for use in the low resistance bearings described herein.

It should be understood that while the low viscosity fluid/lubricant is described as either grease or oil, in some configurations, a combination of grease and oil (or another type of lubricant) may be used. Thus, the aforementioned description is not meant to be limiting.

Figure 6:
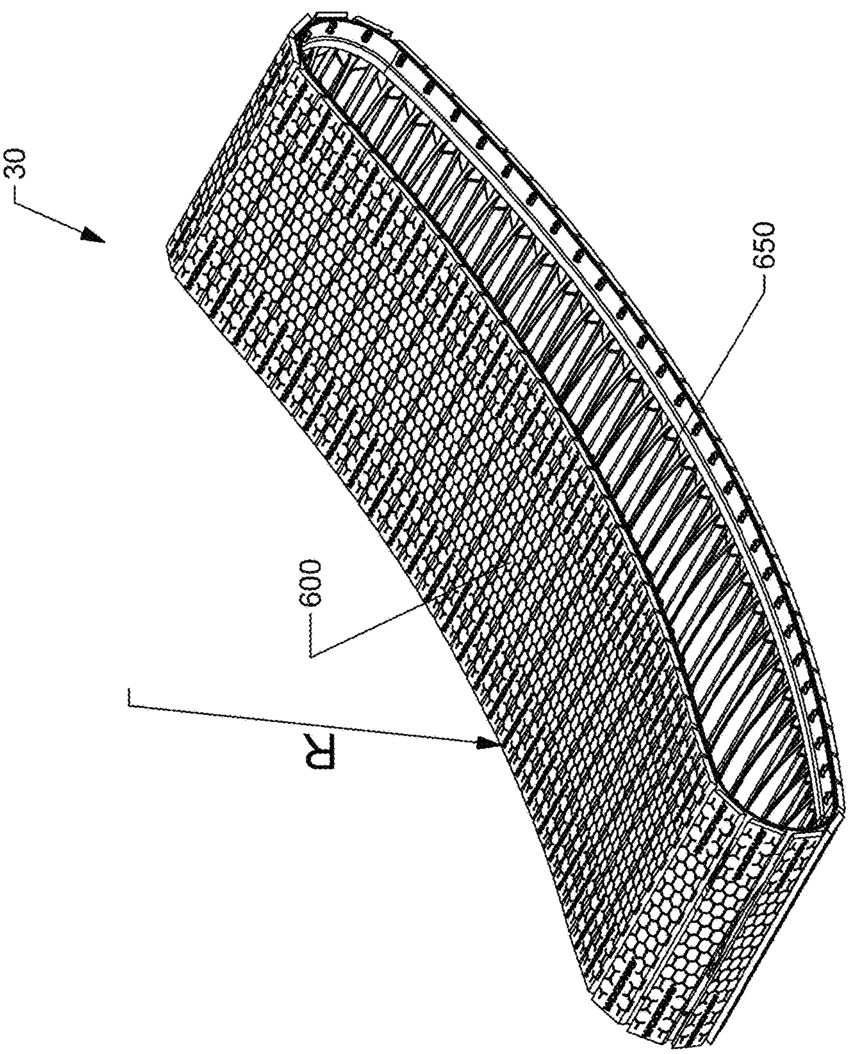
FIG. 6 is a top perspective view of a running belt for the treadmill of FIG. 1, according to an exemplary embodiment.
Figure 7:
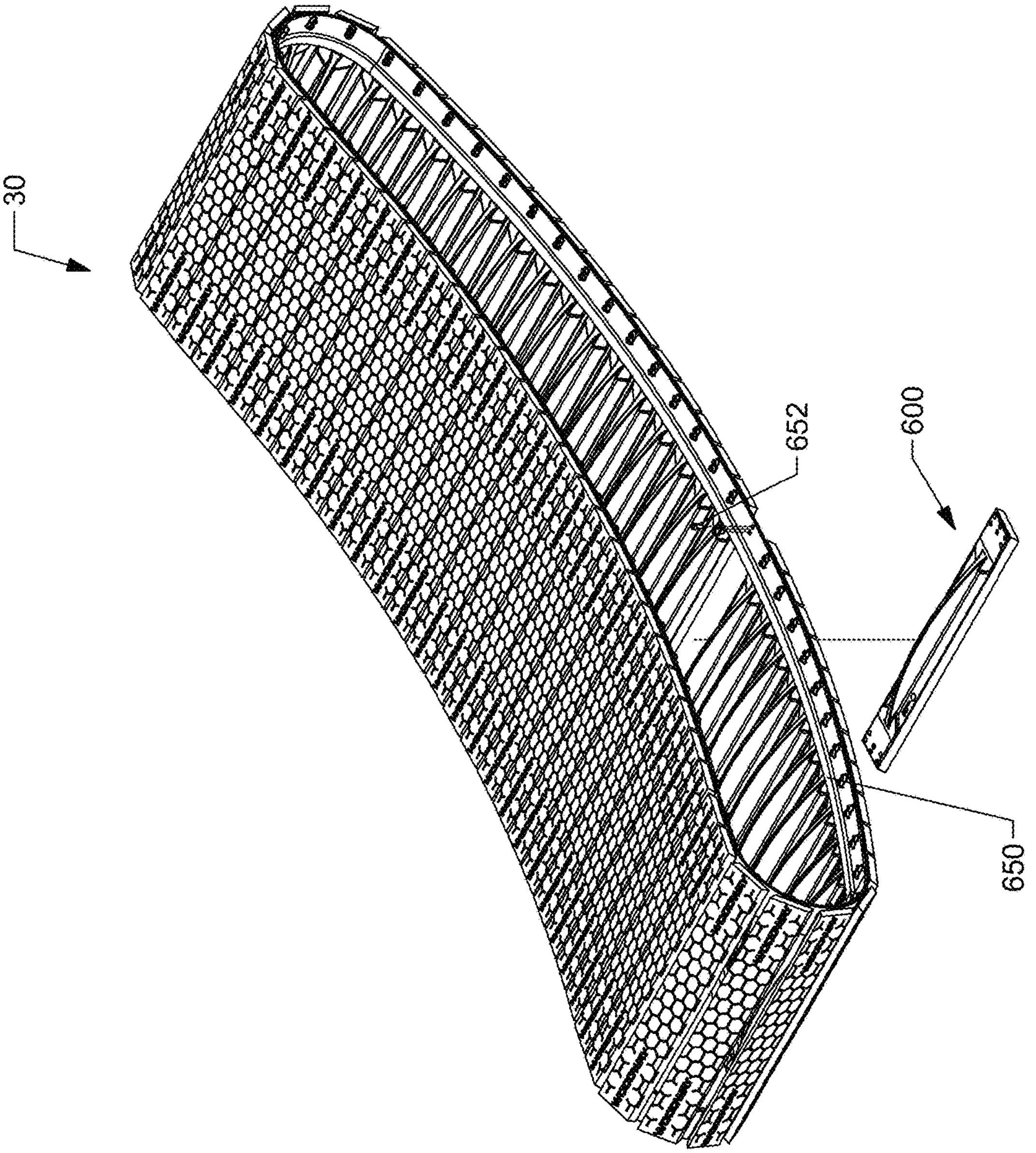
FIG. 7 is an exploded assembly view of the running belt of FIG. 6, according to an exemplary embodiment.
Figure 10:
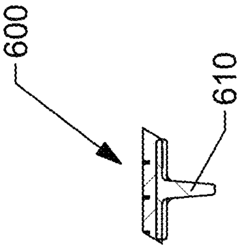
FIG. 10 is an end or side view of the slat of FIG. 8, according to an exemplary embodiment.
Figure 8:
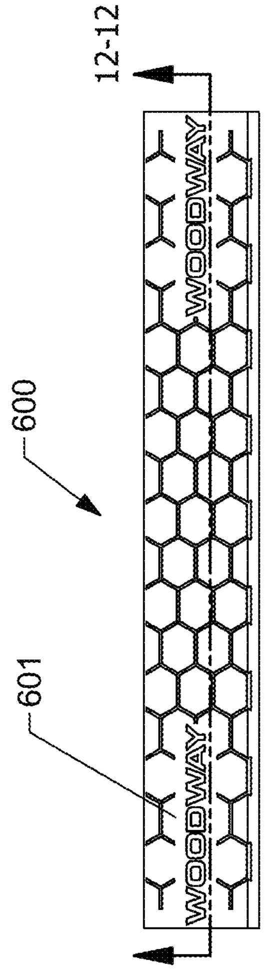
FIG. 8 is a top view of a slat for the running belt of FIGS. 6-7, according to an exemplary embodiment.
Figure 9:
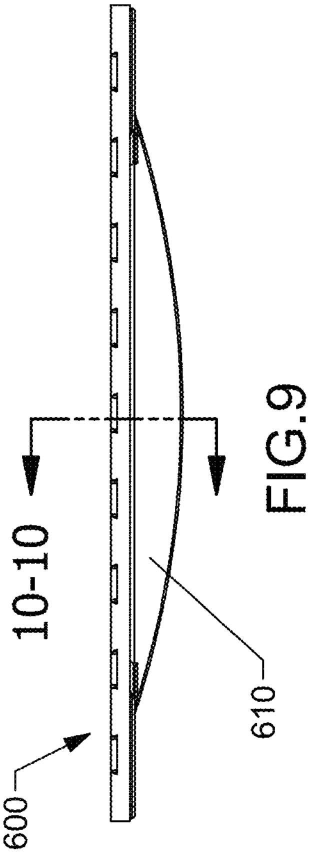
FIG. 9 is a front view of the slat of FIG. 8, according to an exemplary embodiment.

Still another innovation is the precise curve of the running surface 40 as defined, at least in part, by the running belt 30. Referring now to FIGS. 6-7, the running belt 30 of the treadmill 10 is shown according to one embodiment. According to the exemplary embodiment, the running belt 30 is constructed from lightweight materials (e.g., plastics and composites) and when installed on the treadmill has a radius of curvature, R, wherein the radius of curvature, R, is conducive for facilitating the relatively faster acceleration characteristic of the running belt 30 as well as maintaining the desired curved shape.

Figure 14:
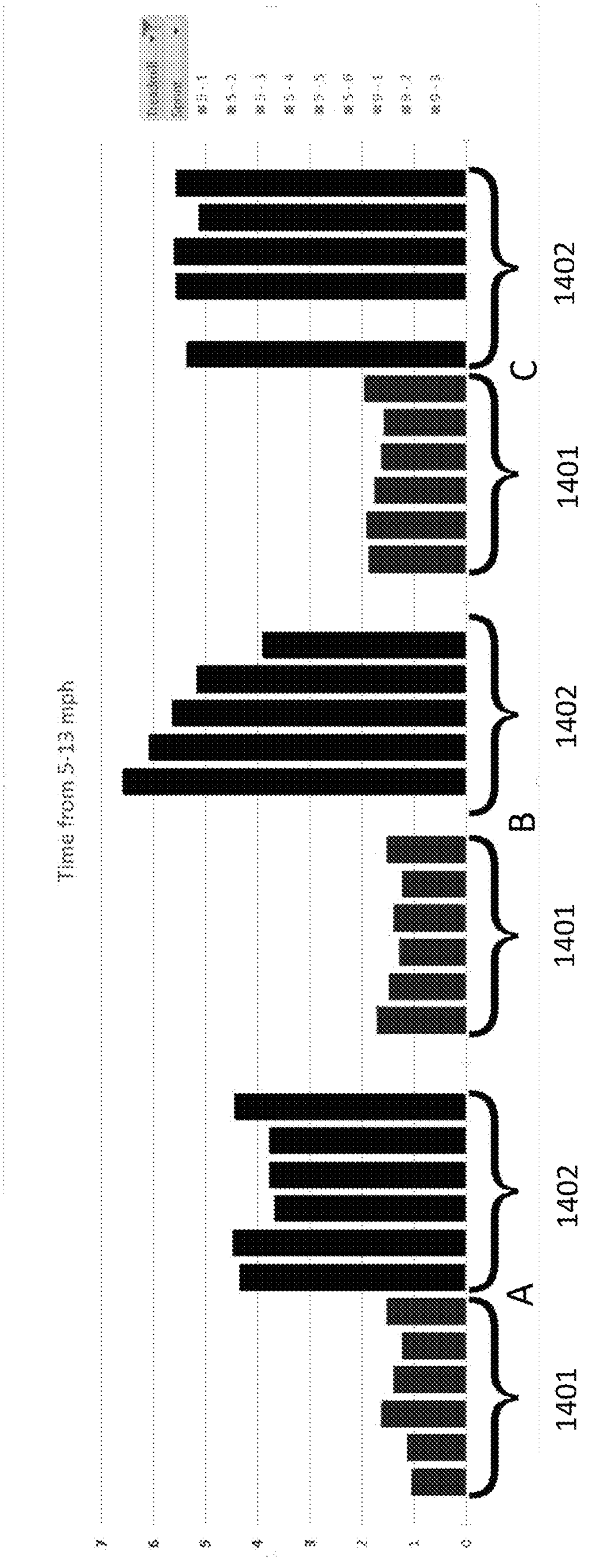
FIG. 14 is a bar graph depicting the acceleration characteristics of the treadmill of FIG. 1, according to an exemplary embodiment.

The radius of curvature, R, refers to the concave portion of the running belt 30, where the concavity is defined by the curve a user experiences when running or using the running belt 30. Applicants have determined that the radius of curvature, R, in combination with factors such as the weight of the running belt 30 and the rolling resistance imposed by the bearings, pulleys and shafts which are coupled to the running belt 30 affects a user's ability to accelerate and stop the running belt 30: a relatively large amount of curvature (corresponding to a smaller radius of curvature R) facilitates a really fast acceleration characteristic but can be more challenging to stop, while too little curvature (corresponding to a larger radius of curvature R) inhibits acceleration but proves rather easy to stop. Applicants have determined that $88<R<138$ inches provides suitable acceleration characteristics and stopping or usability characteristics for treadmills intended for a wide range of applications (e.g. running, jogging and walking). However, Applicants have determined that $88<R<120$ inches provides relatively better acceleration and usability characteristics as a training tool for athletes. In more particularity, Applicants have determined that when R is substantially equal to approximately 90 inches (where approximately indicates +/−1.00 inch) an optimum balance of acceleration and usability is obtained. Evidence of such acceleration characteristics are shown in FIG. 14, after the remaining components of the treadmill 10 are explained that aid usability of the treadmill 10.

In addition to providing an improved acceleration characteristic, the radius of curvature, R, defined above may also allow the curved profile of the running belt 30 to be maintained without the use of additional structures or systems. One of the difficulties associated with using a running surface that has a non-planar shape is inducing the running belt 30 to assume the non-planar shape and then maintaining the running belt 30 in that non-planar shape when the treadmill is being operated. Accordingly, Applicants have determined that the aforementioned radius of curvature, R, in combination with a belt of a particular construction allows the belt to retain and follow the non-planar curve profile.

Still another innovation that facilitates an ability to achieve a relatively fast acceleration characteristic is the construction of the running belt 30. According to exemplary embodiment, the running belt 30 is constructed from lightweight materials, which reduce the force required to initiate movement of the running belt 30. In one embodiment, the lightweight materials include plastic, rubber, and composite components. Conventional belts may utilize substantial metal-based components (e.g., aluminum fins/ribs) that add weight to the running belt 30. By utilizing materials that are relatively less weight than the metal-based materials, Applicants have determined that an increase in acceleration characteristics is provided to the user of the treadmill 10.

Referring now to FIGS. 6-12, the construction of the running belt 30 is shown in greater detail according to one embodiment. As shown in FIGS. 6-7, the running belt 30 is constructed from a plurality of slats 600 coupled to a pair of endless belts 650, where one endless belt 650 is positioned on a left side of the running belt 30 while the other endless belt 650 is positioned on the right side of the running belt 30. The slats 600 may be coupled to the endless belts 650 in any suitable fashion. In the example shown, fasteners 652 (e.g., bolts, screws, etc.) are used to couple the slats 600 to the endless belts 650. However, in other embodiments, the slats 600 may be coupled to endless belts 650 via any other coupling device (e.g., adhesive, welds, interference fits, etc.). By utilizing a plurality of individual slats, each slat 600 may move relative to each other slat 600. The individual relative movement of the slats 600 may provide flexibility to the running belt 30 to absorb at least part of the force imparted onto the running belt 30 by the user to enhance the user's experience reducing the impact stress that could otherwise be imparted to the user when running.

The endless belts 650 are disposed beneath the running surface 40, where the endless belts 650 are structured to engage with the pulleys 121, 141 of the front and rear shaft assemblies 120, 140 as well as the bearings 154 of the bearing rails 150 and 151. Accordingly, the endless belts 650 may have any type of structure (e.g., smooth, toothed, etc.) that facilitates engagement of the endless belts 650 with pulleys 121, 141 and bearings 154 (e.g., smooth, toothed, etc.). In the example depicted, the endless belts 650 include an electrically conductive coating (e.g., graphite, copper, etc.). The conductive coating may be formed with or integrated into the endless belt 650 or applied after the formation/creation of the endless belt 650 (e.g., sprayed on). As described below, the conductive coating facilitates dissipation of accumulated static electricity to a ground source.

Referring more particularly to FIGS. 8-13, the structure of an individual slat 600 is shown according to an example embodiment. The slat 600 generally includes a first side and a second side disposed opposite or substantially opposite the first side. The first side includes an engagement surface 601 while, in the example depicted, the second side includes a support structure. The engagement surface 601 is structured to provide a surface which a user experiences or engages with while using the treadmill. The engagement surface 601 may include any type of configuration. In the example depicted, the surface 601 includes a honeycomb pattern that provides friction to the user to substantially prevent slippage between the user and the surface 601.

As briefly mentioned above, the slat 600 may include a support structure, shown as a rib 610 projecting out therefrom (e.g., relative to the user engagement surface 601) and which extends an entire longitudinal or a substantial longitudinal length of the slat 600. The rib 610 is positioned on an opposite side of the slat 600 relative to the user engagement surface 601. The rib 610 may be constructed from a lightweight material, such as plastic or composites, or may be formed of metal or a metallic alloy. The rib 610 enhances support provided by the slat 600 to the user. Such support may ensure or substantially ensure that the slat 600 may withstand repeated use without failure. A side view of the slat 600 incorporating one embodiment of a rib 610 shows that the slat 600 is T-shaped (see FIG. 10). That being said and as shown, the rib 610 is substantially crescent shaped along the longitudinal length of the slat 600. However, in other embodiments, the rib 610 may have a variety of other shapes (e.g., prism-shaped, triangle shaped, rectangular, etc.). In still other embodiments, the rib 610 may be excluded from the slat 600. In these configurations, the slat 600 may be any other shape. In the embodiment shown, all slats 600 have the same configuration, but in other arrangements, a variety of different slat configurations may be integrated into a single running belt to generate different support, speed and running characteristics for the running belt 30 experienced by the user.

Figure 11:
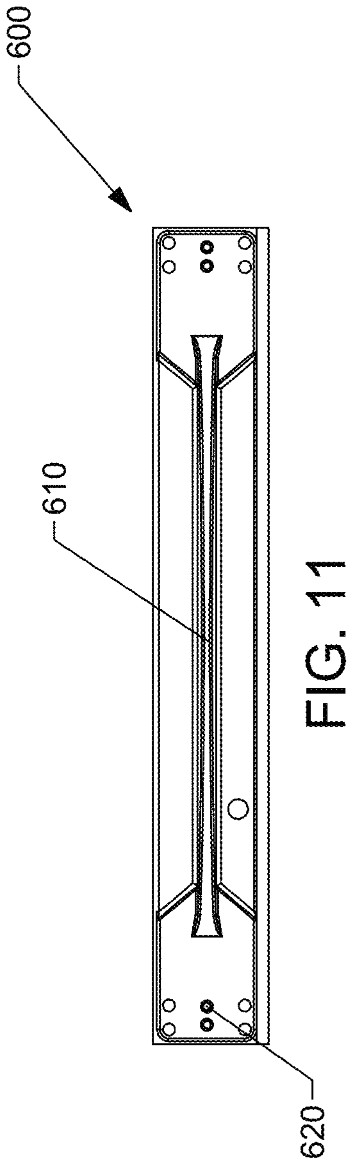
FIG. 11 is a bottom view of the slat of FIG. 8, according to an exemplary embodiment.
Figure 12:
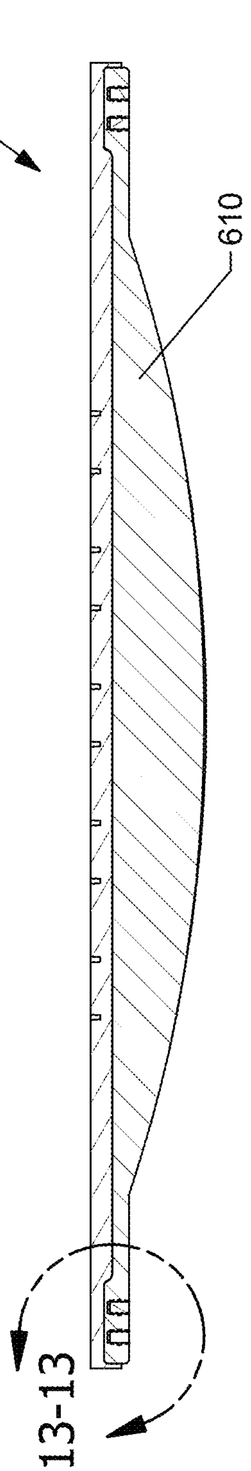
FIG. 12 is a front cross-sectional view of the slat of FIG. 8 along line 12-12, according to an exemplary embodiment.
Figure 13:
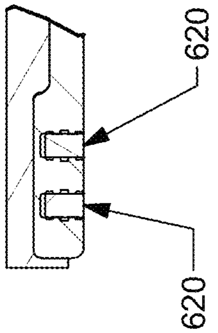
FIG. 13 is a close-up view of section 13-13 of the slat of FIG. 12, according to an exemplary embodiment.

As shown in FIG. 11, the slat 600 defines at least one aperture 620 (e.g., hole, void, opening, etc.) which may be threaded to receive the fastener 652 and thereby couple the slat 600 to the endless belt 650. As shown in FIGS. 11 and 13, a pair of apertures 620 are defined on each end of the slat 600 adjacent the rib 610. The apertures 620 extend substantially half-way through the thickness of the slat 600. In other embodiments, more or less apertures with different structural arrangements may be used. For example, in another embodiment, a snap engagement may be used with a protrusion on the endless belt to couple the slat to the endless belt. In another example, the fasteners may be replaced with an adhesive that couples the slat to the endless belt. All such variations are intended to fall within the scope of the present disclosure.

According to the example depicted, the aperture 620 is constructed from an electrically conductive material (e.g., metal). As such, static electricity formed between the user and the running surface 40 may be conducted to the aperture 620 and fastener 652, which then may be conducted to the endless belt 650 via the aforementioned conductive coating on the endless belt 650. The conductive coating may then transfer the static electricity to the running belt pulleys 121, 141, which may dissipate the static electricity via the anti-static coating to the frame 100, which in turn may be coupled to a ground or sink for the electricity. As such, accumulated static electricity may still be funneled to a ground source despite the structure of the slat 600 being substantially non-metallic.

Applicants have determined that a relatively faster acceleration characteristic of the treadmill 10 may be achieved by at least the aforementioned innovations. Evidence of the same is shown in FIG. 14. In this regard, FIG. 14 depicts a graph of acceleration results from 5 to 13 miles-per-hour (MPH) for three runners (Runner A, Runner B, and Runner C) using a treadmill with the aforementioned innovations compared to a conventional curved treadmill (i.e., a treadmill with a curved running surface), according to one embodiment.

As shown in FIG. 14, relative acceleration of each runner was tested on each treadmill five times. The "Y"-axis is a measure of the time it took each runner to increase the speed from 5 mph to 13 mph. The acceleration results for each runner using the prior art treadmill are identified with reference 1402. The acceleration results for each runner using the treadmill incorporating the present innovations are shown in section 1401. As shown, the time to accelerate to 13 MPH from 5 MPH for each runner is consistently less than three (3) seconds, whereas the time to reach 13 MPH from 5 MPH for each runner on the competing treadmill is consistently over three (3) seconds. Accordingly, based at least in part on the present innovations, Applicants have determined that the innovations of the present disclosure facilitate and provide relatively greater acceleration characteristics to users of the treadmill 10. Performance users who utilize the treadmill 10 for training to increase acceleration may desire this characteristic for training purposes and other reasons.

Referring back to FIG. 1, the treadmill 10 may include a display device 16. The display device 16 may be structured as any type of output display device or input/output device (e.g., touchscreen, etc.) for providing information regarding operation of the treadmill 10 (e.g., routines for a user to follow, instructions for use, etc.). The display device 16 may be electrically powered via a battery included with the treadmill 10 or be adapted to be powered from a wall outlet (or, more generally, an external power source that may be electrically coupled to the treadmill 10 to provide power to the treadmill 10). One piece of information that may be displayed to a user via the display device 16 is the speed of the running belt 30, which may be translated to a user speed. According to other exemplary embodiments, other displays, cup holders, cargo nets, heart rate grips, arm exercisers, TV mounting devices, user worktops, and/or other user experience devices may be incorporated into the treadmill. Further and as shown, the display device 16 may include a plurality of input devices (e.g., buttons, switches, etc.) that enable a user to provide instructions to the treadmill 10 and to control the operation thereof.

Figure 15:
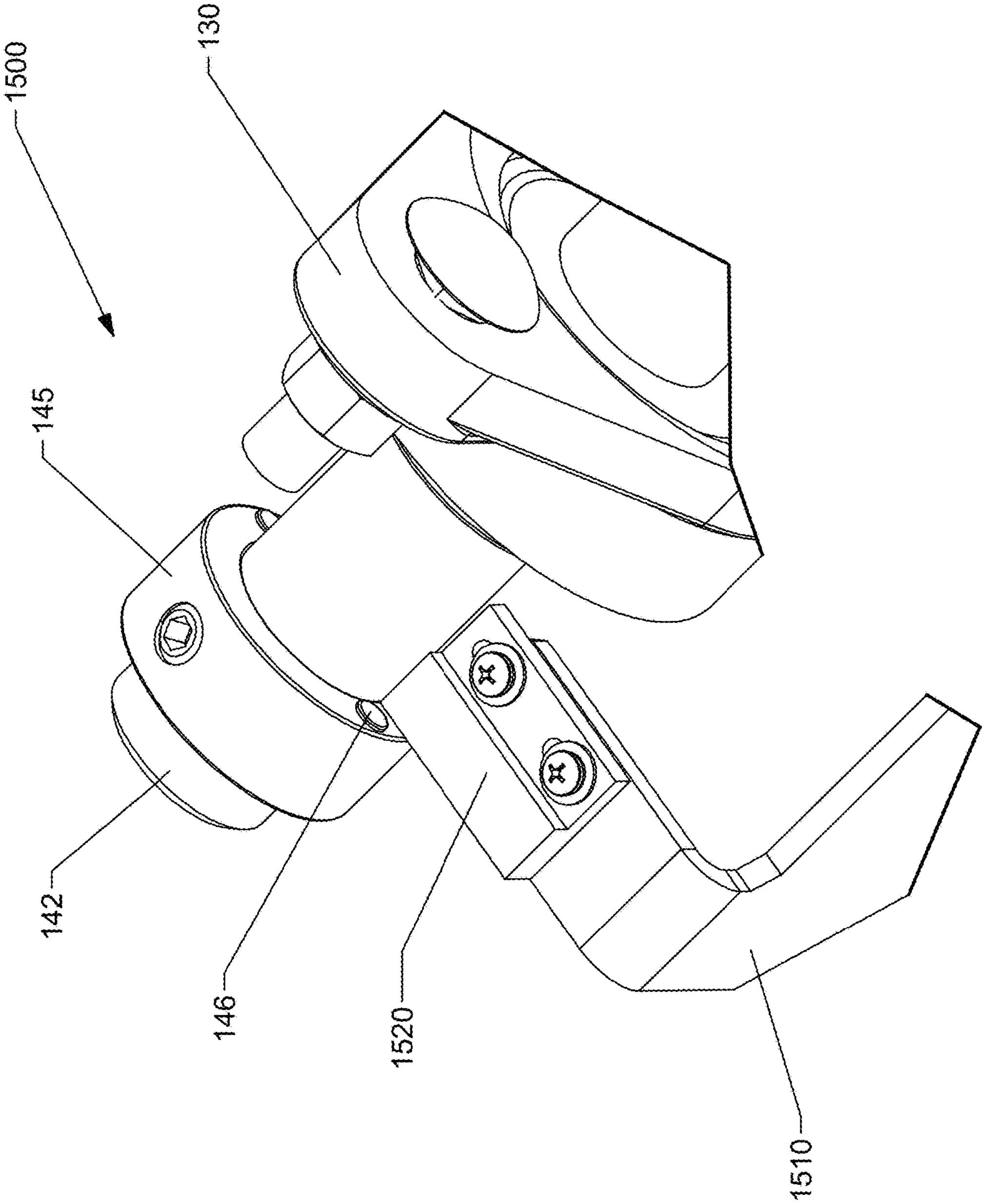
FIG. 15 is a perspective view of a speed sensor assembly for the treadmill of FIG. 1, according to an exemplary embodiment.

Referring now to FIG. 15, a speed sensor assembly 1500 for the treadmill 10 is shown according to one embodiment. While the speed sensor assembly 1500 may be used with either of the front or rear shaft assemblies 120, 140, in the example depicted, the speed sensor assembly 1500 is in operative engagement with the rear shaft assembly 140.

The speed sensor assembly 1500 includes a collar 145 fixedly coupled to the rear shaft 142. The speed sensor assembly 1500 further includes a bracket 1510 fixedly attached to the frame 100 (e.g., side member 82), wherein the bracket 1510 is coupled to a speed sensor 1520. According to the example depicted, the speed sensor 1520 is structured as a magnetic speed sensor. In this regard, the collar 145 includes a magnet 146. The magnet 146 may be disposed on the collar in proximity to the sensor 1520, such that the sensor 1520 may detect when the magnet 146 is near or passing by the sensor 1520. In operation, as the rear shaft 142 rotates, the magnet 146 is detected by the sensor 1520 each time the magnet rotates past the sensor 1520. The sensor 1520 may track the number of detections per unit of time, which may be converted by the sensor 1520 or a controller of the treadmill 10 to a speed of the running belt 30. In the example depicted, communication wires may be disposed in the handrail 14 of the treadmill and communicably and operatively coupled to the speed sensor 1520. As such, via the display device 16, the user may define how often a speed is sensed or otherwise determined.

It should be understood that the present disclosure contemplates other types of speed sensing technologies that may also be used in conjunction with or in place of the speed sensor assembly 1500. In this regard, the magnetic speed sensor of the present disclosure is not meant to be limiting.

While the aforementioned innovations are shown to achieve a relatively faster acceleration characteristic than conventional treadmills, in some instances, a motion-restricting element may be desired to allow or substantially allow the running belt 30 to rotate in only one direction. This motion-restricting element may also be referred to herein as a safety device due to its beneficial effects of resisting running belt movement, which may provide stability to users as they board/de-board the treadmill 10. A number of safety device arrangements are disclosed and described herein with respect to the applications listed above in the CROSS-REFERENCE TO RELATED APPLICATIONS section. While these safety device arrangements may also be used with the treadmill disclosed herein, another arrangement that may be used is shown herein with respect to FIGS. 18-23.

Accordingly, referring now collectively to FIGS. 18-23, another arrangement for a motion-restricting element or safety device is shown according to an example embodiment. Beneficially, the arrangement, configuration, and/or organization may be used with the treadmill described herein above, such that similar reference numbers are used to denote similar components/elements.

Accordingly, a motion-restricting assembly 700 for a treadmill, such as the manual operated treadmill 10, is shown according to an example embodiment. While the motion-restricting assembly 700 is shown herein in use with a manual powered treadmill (e.g., a non-motorized treadmill), it should be understood that the assembly 700 may also be implemented with a motorized treadmill. Further, while the bearing rails 150 and 151 (among other components, such as the running belt itself) are excluded from FIGS. 18-23, this is done for clarity in order to show the motion-restricting assembly 700. Nonetheless and as described herein, the motion-restricting assembly 700 is structured to permit or substantially permit rotation/movement of the running belt in only one direction.

With the above in mind, the motion restricting assembly 700 (e.g., motion constraint system, rotation limiting system, motion restriction system, etc.) is shown to include a shaft 701 supported by a pair of bearing assemblies 130 and coupled to pulleys 702 and 703 (also referred to as first pulley 702 and second pulley 703 for clarity), a motion-restriction assembly 710 coupled to the shaft 701, a front shaft assembly pulley 720 coupled to the first pulley 702 by a belt 721, a rear shaft assembly pulley 740 coupled to the second pulley 703 by a belt 741, and tensioners 750 and 752 cooperating with the belts 721 and 741, respectively, to provide tension to each belt 721 and 741.

As shown, the shaft 701 (e.g., rod, pipe, etc.) is disposed longitudinally in between/intermediate the front shaft 122 and the rear shaft 142. In this regard, the shaft 701 may also be referred to herein as intermediary shaft 701. It should be understood that the precise intermediate position of the shaft 701 is highly configurable, whereby the shaft 701 may be disposed: closer or proximate to the front shaft assembly 120 than the rear shaft assembly 140, closer or proximate to the rear shaft assembly 140 than the front shaft assembly 120, or approximately in the middle of the front and rear shaft assemblies 120 and 140. Thus, the relative positioning of the shaft 701 with respect to each of the front and rear shaft assemblies 120 and 140 is not meant to be limiting. As alluded to above, the shaft 701 may be coupled to the frame 100 by bearing assemblies 130. In particular, a first bearing assembly 130 may be used to couple the shaft 701 to the left side frame member 80 while a second bearing assembly 130 may be used to couple the shaft 701 to the right side frame member 82. Beneficially, using the low viscosity bearing assemblies 130 may decrease friction and increase the ease of rotation of the shaft 701. As a result and despite the shaft 701 representing an extra component to the treadmill versus the assembly described herein above, the low viscosity bearings of the bearing assembly 130 may help to offset/reduce the friction/resistance added by the additional components of the motion-restricting assembly 700. In use, the bearing assemblies 130 rotatably couple the shaft 701 to each of the left and right side frame members 80, 82, such that the shaft 701 extends between each of the left and right side frame members 80, 82 and is permitted to rotate relative to each of the left and right side frame members 80 and 82.

Figure 22:
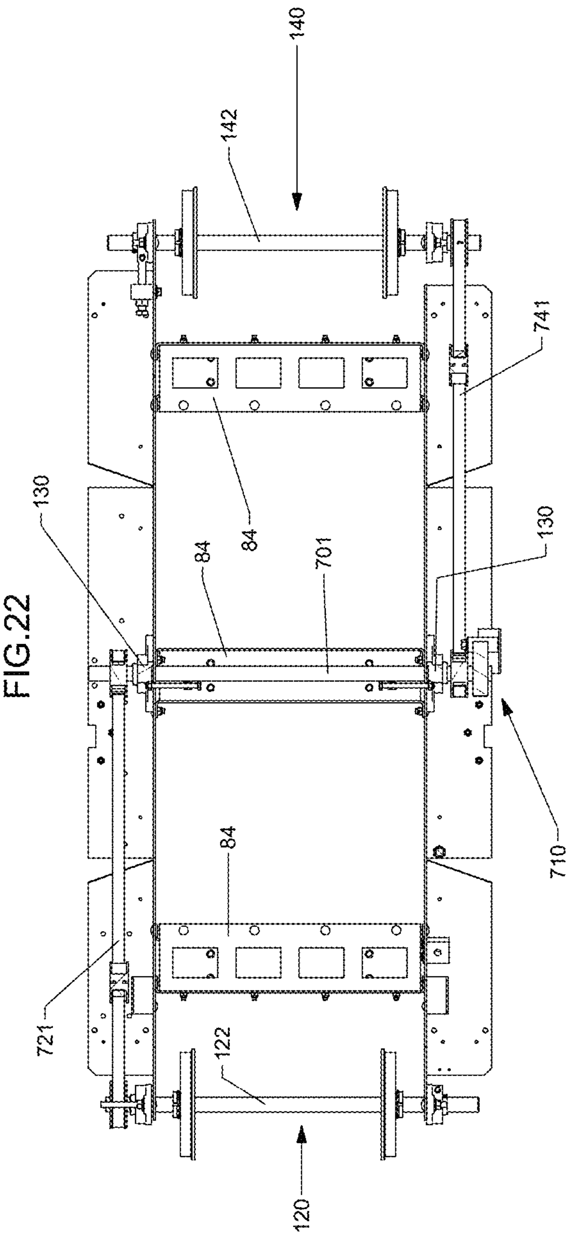
FIG. 22 is a bottom view of FIG. 18, according to an exemplary embodiment.
Figure 23:
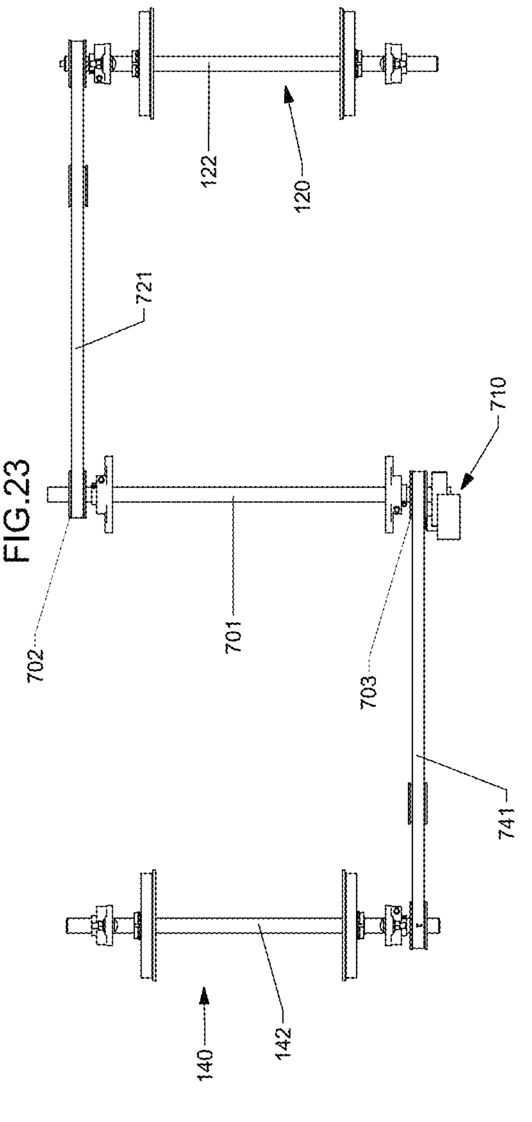
FIG. 23 is a schematic diagram of the motion restriction system of FIG. 18 with a majority of the components of the frame removed, according to an exemplary embodiment.

In the example shown, the intermediate shaft 701 is aligned substantially with a cross-member 84 (see FIG. 22). Beneficially, the cross-member 84 is shown to substantially surround/cover the shaft 701. As a result, the cross-member 84 may function as a shield or shroud for the shaft 701 from unwanted debris.

As shown, the shaft 701 is coupled to each of the front shaft 122 and the rear shaft 142. More particularly, the shaft 701 includes a first pulley 702 and a second pulley 703. The first and second pulleys 702 and 703 are disposed adjacent the ends of the shaft 701 proximate to the outer surfaces 86 and 87 of the left and right side frame members 80 and 82, respectively. Further, the front shaft assembly 120 includes a front shaft assembly pulley 720 coupled to the front shaft 122 and disposed proximate the outer surface 86 of the left side frame member 80 of the frame 100 while the rear shaft assembly 140 includes a rear shaft assembly pulley 740 coupled to the rear shaft 142 and disposed proximate the outer surface 87 of the right side frame member 82 of the frame 100. Thus, the front shaft assembly pulley 720 and the rear shaft assembly pulley 740 are disposed on opposite sides of the frame 100. Accordingly and as shown, the first pulley 702 is rotatably coupled to the front shaft assembly pulley 720 by the belt 721 while the second pulley 703 is rotatably coupled to the rear shaft assembly pulley 740 by the belt 741. It should be understood that the intermediate shaft 701 is coupled to each of the front and rear shaft assemblies 120 and 140. The belts 721 and 741 and pulleys 702 and 703 may have any type of cooperating structure (e.g., toothed pulley and toothed belts, v-shaped pulley and v-shaped belt, smooth pulley and smooth belt, ribbed belt and ribbed pulley, etc.). Thus, those of ordinary skill in the art will appreciate the high configurability of the pulleys 702 and 703 and belts 721 and 741, with all such configurations intended to fall within the scope of the present disclosure.

Beneficially, by disposing/positioning the pulleys 702 and 703, pulleys 720 and 740, and the belts 721 and 741 proximate the outer surfaces 86 and 87 of the left and right side frame members 80 and 82 of the frame 100, these components of the motion-restricting system 700 are relatively easier to maintain and observe compared to if positioned between the left and right side frame members 80 and 82. In this regard, technicians or users do not need to remove the running belt 30 in order to access the aforementioned components of the motion-restricting assembly 700. Of course, in other embodiments, at least some of the aforementioned components may be disposed between the left and right side frame members 80 and 82. This configuration may be desirable if the goal is to reduce the space occupied by the treadmill, such that the manufacturer wants to position as many components as possible within the space between the left and right side frame members 80 and 82.

In the example depicted, tensioners or tension assemblies may be used to control/apply the tension applied to the belts 721 and 741. In this regard and as shown, a tensioner 750 is shown to be engaged with the belt 721 while a tensioner 752 is shown to be engaged with the belt 741. In this regard, the tensioner 750 is coupled to the frame 100 on the outer surface 86 of the left side frame member 80 while the tensioner 752 is coupled to the frame 100 on the outer surface 87 of the right side frame member 82. In one embodiment, the tensioners 750 and 752 are fixedly attached to the frame 100 (i.e., incapable of moving). In another embodiment, the tensioners 750 and 752 are moveably coupled to the frame 100 whereby the tensioners 750 and 752 may move to adjust/control the amount of tension applied to the belts 721 and 741. In this embodiment, a lock mechanism may be included with the tensioners 750 and 752 to hold the tensioners at the desired position exerting the desired amount of tension on the respective belts. An example lock mechanism may be similar to the tension assembly 400 described herein above. It should be understood that the tensioners 750 and 752 may have any configuration capable of providing tension to the belts 721 and 741, respectively. For example, the tensioners 750 and 752 may rotate, may be fixed, may be cylindrical shaped (like shown), may have a non-cylindrical shape, etc. Thus, those of ordinary skill in the art will appreciate the high configurability of the tensioners 750 and 752 with all such variations intended to fall within the scope of the present disclosure.

As shown and mentioned above, a motion-restriction assembly 710 is coupled to the intermediate shaft 701. In particular, the motion-restriction assembly 710 is coupled to the intermediate shaft 701 proximate to the second pulley 703. In this regard, the motion-restriction assembly 710 may be more directly coupled to the rear shaft assembly 140 than to the front shaft assembly 120. As shown, the motion-restriction assembly 710 includes a housing 711, a motion-restricting element 712, and a bracket 713. The housing 711 (e.g., support structure) is structured to house or otherwise support the motion-restricting element 712. The bracket 713 (e.g., coupling device or structure) is structured to couple the housing 711 and motion-restricting element 712 to the frame 100. In particular and in the example shown, the bracket 713 couples the motion-restricting element 712 to the outer surface 87 of the right side frame member 82 of the frame 100.

According to the example shown, the motion-restricting element 712 is structured as a one-way bearing. The one-way bearing may have the same or similar structure as described in the related applications located under the CROSS-REFERENCE TO RELATED APPLICATIONS section. Thus, the motion-restricting element 712 may be coupled to the shaft 701 in the manner described in those applications (e.g., a key and keyway engagement) or via any other suitable coupling manner. The one-way bearing permits rotation of the intermediate shaft 701 in only one rotational direction because the one-way bearing is coupled to the intermediate shaft 701. In particular, the one-way bearing allows rotation of the intermediate shaft in the direction which corresponds to forward direction rotation of the running belt (counterclockwise based on the view in FIG. 21).

Based on the foregoing and using the viewpoint depicted in FIG. 21, operation of the motion-restriction assembly may be described as follows. After a user has boarded the treadmill, the user may begin walking (or another form of using the treadmill). The force created by walking corresponds with the running belt rotating in a counterclockwise direction. Due to the engagement of the running belt with the front running belt pulleys 121 and the rear running belt pulleys 141, the pulleys 121 and 141 also rotate counterclockwise. The force of the counterclockwise rotation of the pulleys 121 and 141 is transferred to the front and rear shafts 122 and 142, respectively, which transfers the counterclockwise rotational force to the pulleys 702 and 703. Due to the belts 721 and 741, the counterclockwise rotational force is then transferred to the intermediate shaft 701. The one-way bearing is then structured to permit counterclockwise rotation of the shaft 701. That is to say, the inner race of the one-way bearing (which is coupled to the shaft 701) may rotate counterclockwise while the outer race of the one-way bearing is fixed or substantially fixed in the housing 711. As a result, the running belt is permitted to rotate in the counterclockwise direction in response to a force applied by the user to the running belt 30.

Figure 21:
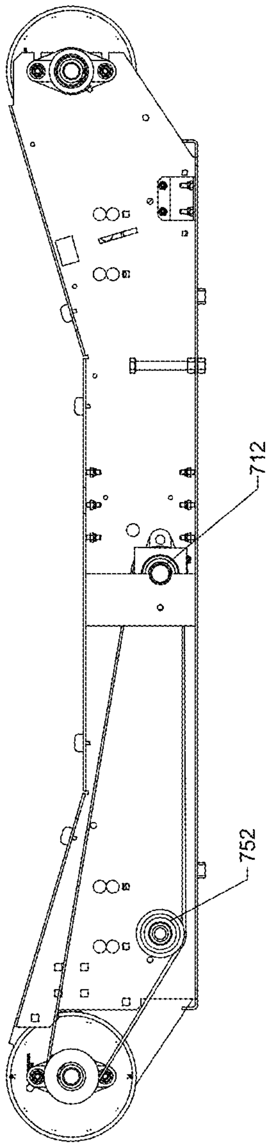
FIG. 21 is a right side view of FIG. 18, according to an exemplary embodiment.

If a clockwise rotational force (rearward direction as seen in FIG. 21) is applied to the running belt 30 (i.e., to push, move, or otherwise urge the running belt to move in a clockwise direction), the clockwise force is transferred to the intermediate shaft. Due to the structure of the one-way bearing (e.g., sprags, etc.), the inner race then applies a force to push the outer race clockwise. However, the outer race is fixed in the housing 711. As a result, the one-way bearing is prevented from rotating clockwise. The intermediate shaft 701 and shafts coupled thereto are then also prevented from rotating clockwise. As a result, the running belt is then also prevented from rotating clockwise or in the rearward direction. In this regard, the motion-restricting assembly 710 allows rotation of the running belt in only one rotational direction. This provides a safety feature so that the user can climb on the rear portion of the treadmill by stepping on the running belt at a location adjacent the rear end of the treadmill, but the running belt 30 is prevented from rotating in a rearward direction.

Beneficially, not only does the motion-restricting assembly 710 only allow for only one rotational direction of the running belt, the assembly 700 couples the front shaft assembly 120 to the rear shaft assembly 140. As a result, the front pulleys 121 and rear pulleys 141 may be driven to rotate at the same or substantially the same rotational velocity. This may function to ensure a pleasant user experience by avoiding different rotational velocities of the running belt pulleys which may function to move the running belt in a jerky manner (i.e., accelerating, decelerating, etc. at random points).

It should be understood that the aforementioned description of the assembly 700 is illustrative or exemplary only. In this regard, various modifications may be implemented without departing from the scope of the present disclosure. For example, in another configuration, a different type of motion-restricting element may be used (e.g., a cam lock, another type of freewheel clutch, etc.). As another example, in another configuration, the motion-restricting element may be implemented with the intermediate shaft proximate the first pulley 702. As yet another example, in yet another configuration, a motion-restricting element may be implemented with each of the first and second pulleys 702 and 703. Thus, while the motion-restricting element is shown as a one-way bearing positioned proximate the second pulley 703, those of ordinary skill in the art will appreciate and recognize the high configurability of the system 700 with all such variations intended to fall within the scope of the present disclosure.

Further, in the example shown of FIGS. 18-23, a different tension assembly is shown relative to the tension assembly 400. In this example, the tension assembly 450 cooperates with the rear shaft assembly 140, but is movable in a substantially linear or non-curved manner. In particular and as shown, the tension assembly 450 includes similar components as the tension assembly 400 (e.g., block 402 and rod 404), except that the bearing assembly 130 is coupled to the frame 100 via an upper slot 451 and a lower slot 452. The upper and lower slots 451, 452 are substantially linear shaped; in the example shown, the upper and lower slots 451, 452 are substantially parallel oriented relative to a support surface for the frame 100. In this example, the rod 404 is movable to apply pressure to the bearing assembly 130 to move the bearing assembly 130 along in the slots 451, 452. In this regard, the bearing assembly 130 may move as a unit in a substantial linear fashion to control a relative position of the rear shaft 142 in relation to the front shaft 122 and the frame 100. Accordingly, movement of the rear shaft 142 may control/adjust an amount of tension on the running belt.

While not shown, it should be understood that in other embodiments, the tension assembly 450 may also be useable or only useable with the front shaft assembly 120. Further, in still other embodiments, the tension assembly 400 described herein may be used with one or both of the front and rear shaft assemblies 120 and 140. In yet other embodiments, a combination of the tension assembly 400 and the tension assembly 450 may be used with the treadmill. Thus, the present disclosure contemplates a wide array of possibilities with all such varieties intended to fall within the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

Additionally, while the bulk of the discussion herein is focused on training and physical fitness, this specific use-case example is not meant to be limiting. In this regard, persons skilled in the art will understand that all of the structures and methods described herein are equally applicable in at least medical or therapeutic applications as well.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

In this regard, the various adjectives that are used throughout this disclosure with the term "coupled" are intended to characterize the "coupled" to relationship (e.g., rotatably coupled, movably coupled, pivotably coupled, etc.). As is apparent from the plain and ordinary meaning, these adjectives (e.g., rotatably, movably, pivotably, etc.) are intended to define and characterize the relationship of the coupled components. For example, component A "rotatably coupled" to component B means that component A is joined directly or indirectly (e.g., via an intermediary component) to component B in such a way as to permit rotation of component A relative to component B or vice versa. That being said, this characterization—"rotatably coupled" (as well as other characterizations that signify relative movement using the term "coupled," such as "movably coupled" or "pivotably coupled" and the like)—does not mean/nor is intended to mean that the entire component must move relative to the other component. In other words, when for example component A is characterized as being "rotatably coupled" to component B, such a relationship characterization does not necessarily mean that the entirety of component A is capable of rotating relative to component B. Rather, Applicant expressly intends this relationship to be broadly defined to mean at least part of the component moves, rotates, pivots, etc. (i.e., whatever the movement-related adjective term that is used to define the coupled to relationship) relative to the other component. In this regard and in certain configurations, the entire component may move relative to the other component. In other configurations, only part of the component may move relative to the other component (for example, this situation is applicable with bearings where typically only one race moves relative to another race).

It should be noted that the orientation of various elements may differ according to other exemplary embodiments and that such variations are intended to be encompassed by the present disclosure. For example, while the running belt is depicted as a slat-type running belt herein, the present disclosure contemplates the use of a non-slat running belt as well. In this regard, the non-slat running belt may include a continuous-loop type/style running belt including, but not limited to, a continuous urethane (e.g., polyurethane) loop, a continuous loop made of plastics other than polyurethane, a plastic belt reinforced with reinforcing elements (e.g., metal wire, a relatively harder plastic, wood, etc.), a continuous foam loop, and so on. Thus, the continuous-loop type/style running belt may also be used with at least some of concepts disclosed herein.

It is important to note that the constructions and arrangements of the manual treadmill as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed:

1. A manually powered treadmill, comprising:
- a frame;
- a front rotatable element coupled to the frame;
- a rear rotatable element coupled to the frame;
- a bearing assembly at least partially supporting one of the front or the rear rotatable elements, wherein the bearing assembly comprises a predefined low viscosity bearing fluid; and
- a running belt disposed about the front and rear rotatable elements, wherein the running belt defines a non-planar running surface, and wherein the running belt includes;
  - a first endless belt; and
  - a plurality of slats, each slat having a first side and a second side and coupled to the first endless belt, wherein each slat in the plurality of slats defines at least one aperture, wherein the at least one aperture is structured to receive a fastener to facilitate coupling each slat to the first endless belt, wherein the at least one aperture is constructed from an electrically conductive material, wherein the first endless belt includes an electrically conductive coating, and wherein, in use, generated static electricity between a user and the non-planar running surface is conducted to the at least one aperture and the fastener, to the first endless belt, and then subsequently or eventually to a ground for the generated static electricity.

2. The manually powered treadmill of claim 1, wherein the non-planar running surface has a radius of curvature in a range of approximately 88 to 138 inches.

3. The manually powered treadmill of claim 2, wherein the radius of curvature is approximately 90 inches.

4. The manually powered treadmill of claim 1, further comprising:
- a first plurality of bearings coupled to the frame on a first side of the frame and at least partially supporting the running belt; and
- a second plurality of bearings coupled to the frame on a second side of the frame opposite the first side of the frame and at least partially supporting the running belt;
- wherein the first plurality of bearings defines a first top profile and the second plurality of bearings defines a second top profile, wherein each of the first and second top profiles has a radius of curvature in a range of approximately 88 to 138 inches.

5. The manually powered treadmill of claim 1, wherein the predefined low viscosity bearing fluid is low viscosity grease with a National Lubricating Grease Institute classification of between 000 and 1.

6. The manually powered treadmill of claim 1, wherein each of the plurality of slats comprises a rib that extends along a longitudinal direction of an associated slat.

7. The manually powered treadmill of claim 6, wherein the rib has an at least partial curve shape.

8. A treadmill, comprising:
- a frame;
- a front rotatable element coupled to the frame;
- a rear rotatable element coupled to the frame;
- a running belt disposed about the front and rear rotatable elements, and wherein the running belt includes;
  - a first endless belt; and
  - a plurality of slats, wherein each slat in the plurality of slats defines at least one aperture, wherein the at least one aperture is structured to receive a fastener to facilitate coupling each slat to the first endless belt, wherein the at least one aperture is constructed from an electrically conductive material, wherein the first endless belt includes an electrically conductive coating, and wherein, in use, generated static electricity between a user and the running belt is conducted to the at least one aperture and the fastener, to the first endless belt, and then subsequently or eventually to a ground for the generated static electricity; and
- a plurality of bearings coupled to the frame, wherein the plurality of bearings at least partially support the running belt, wherein the plurality of bearings define a top profile with a radius of curvature in a range of approximately 88 to 138 inches, wherein at least one bearing in the plurality of bearings is a low-resistance bearing that utilizes a predefined low viscosity bearing fluid.

9. The treadmill of claim 8, further comprising a safety device coupled to at least one of the front or rear rotatable elements, wherein the safety device is operable to substantially prevent rotation of the at least one of the front or rear rotatable elements in a first rotational direction and operable to permit rotation of the at least one of the front or rear rotatable elements in a second rotational direction opposite the first rotational direction.

10. The treadmill of claim 9, wherein the safety device comprises a one-way bearing.

11. The treadmill of claim 8, wherein the radius of curvature is in a range of approximately 88 to 120 inches.

12. The treadmill of claim 8, wherein the running belt defines a non-planar surface, and wherein the non-planar surface follows a top profile, and wherein at least a portion of at least one of the front rotatable element or the rear rotatable element is positioned non-tangential to the top profile.

13. The treadmill of claim 8, wherein each of the plurality of slats comprises a rib that extends along a longitudinal direction of an associated slat.

14. A treadmill, comprising:

a frame;

a rotatable element coupled to the frame;

an intermediate member coupled to the frame, wherein the intermediate member is disposed intermediate a front end and a rear end of the treadmill, and wherein the intermediate member is coupled to the rotatable element;

a running belt disposed about the rotatable element, wherein the running belt defines a non-planar running surface, and wherein the running belt includes;

a first endless belt; and a plurality of slats and each slat of the plurality of slats is coupled to the first endless belt, wherein each slat has a first side and a second side and defines at least one aperture, wherein the at least one aperture is structured to receive a fastener to facilitate coupling to the first endless belt, wherein the at least one aperture is constructed from an electrically conductive material, wherein the first endless belt includes an electrically conductive coating, and wherein, in use, generated static electricity between a user and the non-planar running surface is conducted to the at least one aperture and the fastener, to the first endless belt, and then subsequently or eventually to a ground for the generated static electricity; and a safety device coupled to the intermediate member, the safety device operable to substantially prevent rotation of the rotatable element in a first rotational direction and to permit rotation of the rotatable element in a second rotational direction opposite the first rotational direction.

15. The treadmill of claim 14, further comprising a bearing assembly at least partially supporting the rotatable element, wherein the bearing assembly comprises a predefined low viscosity bearing fluid.

16. The treadmill of claim 14, wherein the safety device comprises a one-way bearing.

* * * * *